(12) United States Patent
Wang et al.

(10) Patent No.: US 8,879,150 B1
(45) Date of Patent: Nov. 4, 2014

(54) OPTICAL THIN-FILM POLARIZING BANDPASS FILTER

(75) Inventors: Ligang Wang, Penfield, NY (US); Craig Hodgson, Pittsford, NY (US); Turan Erdogan, Spencerport, NY (US)

(73) Assignee: SEMROCK, Inc., Rochester, NY (US)

(*) Notice: Subject to any disclaimer, the term of this patent is extended or adjusted under 35 U.S.C. 154(b) by 759 days.

(21) Appl. No.: 12/728,124

(22) Filed: Mar. 19, 2010

Related U.S. Application Data

(60) Provisional application No. 61/161,984, filed on Mar. 20, 2009.

(51) Int. Cl.
*G02B 5/30* (2006.01)
*G02B 27/28* (2006.01)

(52) U.S. Cl.
USPC ............ 359/485.03; 359/489.07; 359/489.19; 359/588; 359/590; 359/900; 427/163.1

(58) Field of Classification Search
USPC .......... 359/485.01, 485.02, 485.03, 583, 588, 359/589, 900, 489.07, 489.19, 590; 427/163.1
See application file for complete search history.

(56) References Cited

U.S. PATENT DOCUMENTS

| | | | |
|---|---|---|---|
| 2,406,318 A | 8/1946 | Brace | |
| 2,670,400 A | 2/1954 | Grunwald | |
| 3,306,158 A | 2/1967 | Makabe et al. | |
| 3,390,604 A | 7/1968 | Makabe | |
| 3,492,478 A | 1/1970 | Smith | |
| 3,666,351 A | 5/1972 | Pao | |
| 3,759,604 A | 9/1973 | Thelen | |
| 3,861,788 A | 1/1975 | Webster | |
| 3,864,037 A | 2/1975 | Johnson | |
| 4,009,453 A | 2/1977 | Mahlein | |
| 4,082,464 A | 4/1978 | Johnson, Jr. | |
| 4,084,909 A | 4/1978 | Mathisen | |
| 4,141,653 A | 2/1979 | Arnold | |

(Continued)

FOREIGN PATENT DOCUMENTS

| DE | 20 2008 016 287 U1 | 4/2009 |
|---|---|---|
| EP | 1 130 432 A2 | 9/2001 |

(Continued)

OTHER PUBLICATIONS

A. Thelen, "Nonpolarizing edge filters," J. Opt. Soc. Am., vol. 71, pp. 309-314 (Mar. 1981)(6 pages).

(Continued)

*Primary Examiner* — Ricky D Shafer
(74) *Attorney, Agent, or Firm* — Finnegan, Henderson, Farabow, Garrett & Dunner, LLP

(57) ABSTRACT

Optical components and their methods of manufacture are provided, including a first stack of layers configured to exhibit a first stop band for s-polarized radiation and a second stop band for p-polarized radiation incident on the first stack of layers at an oblique angle, a second stack of layers configured to exhibit a third stop band for s-polarized radiation and a fourth stop band for p-polarized radiation incident on the second stack of layers at the oblique angle, where the cut-on wavelength for the first stop band is approximately equal to or larger than the cut-off wavelength for the third stop band. Optical components are further provided to include extended blocking functionality, and to permit stress balancing in thin-film coatings on opposite sides of a substrate.

48 Claims, 21 Drawing Sheets

(56) References Cited

U.S. PATENT DOCUMENTS

| | | | |
|---|---|---|---|
| 4,176,916 | A | 12/1979 | Carpenter |
| 4,373,782 | A | 2/1983 | Thelen |
| 4,395,090 | A * | 7/1983 | Mahlein .................. 359/586 |
| 4,410,272 | A | 10/1983 | Beauvineau et al. |
| 4,461,532 | A | 7/1984 | Sato et al. |
| 4,684,255 | A | 8/1987 | Ford |
| 4,733,926 | A | 3/1988 | Title |
| 4,738,535 | A | 4/1988 | Webster |
| 4,772,798 | A | 9/1988 | Craig |
| 4,775,234 | A | 10/1988 | Shimomura |
| 5,034,613 | A | 7/1991 | Denk et al. |
| 5,132,826 | A | 7/1992 | Johnson et al. |
| 5,149,578 | A | 9/1992 | Wheatley et al. |
| 5,221,957 | A | 6/1993 | Jannson et al. |
| 5,400,174 | A | 3/1995 | Pagis et al. |
| 5,449,413 | A | 9/1995 | Beauchamp et al. |
| 5,481,402 | A | 1/1996 | Cheng et al. |
| 5,591,981 | A | 1/1997 | Heffelfinger et al. |
| 5,625,491 | A * | 4/1997 | von Gunten et al. ..... 359/485.02 |
| 5,767,965 | A | 6/1998 | Zhou et al. |
| 5,781,332 | A | 7/1998 | Ogata |
| 5,781,341 | A | 7/1998 | Lee |
| 5,796,512 | A | 8/1998 | Wachman et al. |
| 5,852,498 | A | 12/1998 | Youvan et al. |
| 5,914,817 | A * | 6/1999 | Browning et al. ............ 359/634 |
| 5,926,317 | A | 7/1999 | Cushing |
| 5,953,169 | A | 9/1999 | Tsai |
| 6,075,599 | A | 6/2000 | Milman et al. |
| 6,110,337 | A | 8/2000 | Sullivan et al. |
| 6,115,180 | A | 9/2000 | Hirai et al. |
| 6,217,720 | B1 | 4/2001 | Sullivan et al. |
| 6,249,378 | B1 * | 6/2001 | Shimamura et al. ..... 359/485.02 |
| 6,292,299 | B1 | 9/2001 | Liou |
| 6,344,653 | B1 | 2/2002 | Webb et al. |
| 6,362,904 | B1 | 3/2002 | Cormack |
| 6,611,378 | B1 | 8/2003 | Wang et al. |
| 6,700,690 | B1 | 3/2004 | Buchsbaum et al. |
| 6,781,757 | B2 | 8/2004 | Cormack |
| 6,809,859 | B2 | 10/2004 | Erdogan et al. |
| 6,879,619 | B1 | 4/2005 | Green et al. |
| 6,894,838 | B2 | 5/2005 | Mizrahi et al. |
| 6,943,938 | B1 | 9/2005 | Liu et al. |
| 7,050,224 | B2 | 5/2006 | Kawamata et al. |
| 7,068,430 | B1 | 6/2006 | Clarke et al. |
| 7,119,960 | B1 | 10/2006 | Erdogan et al. |
| 7,123,416 | B1 | 10/2006 | Erdogan et al. |
| 7,379,242 | B2 * | 5/2008 | Ushigome ................ 359/485.02 |
| 7,411,679 | B2 | 8/2008 | Erdogan et al. |
| 7,420,678 | B2 | 9/2008 | Lundgren et al. |
| 7,453,568 | B2 | 11/2008 | Kawamata et al. |
| 7,961,392 | B2 * | 6/2011 | Maeda et al. ............ 359/485.03 |
| 8,059,327 | B1 | 11/2011 | Erdogan et al. |
| 8,441,710 | B2 * | 5/2013 | Wang et al. .................... 359/290 |
| 2002/0054614 | A1 | 5/2002 | Jin |
| 2004/0240093 | A1 | 12/2004 | Yoshikawa et al. |
| 2005/0171630 | A1 | 8/2005 | Dinauer et al. |
| 2006/0007547 | A1 | 1/2006 | Kamikawa |
| 2006/0158991 | A1 | 7/2006 | Hatano et al. |
| 2006/0228089 | A1 | 10/2006 | Shimokozono et al. |
| 2007/0268568 | A1 | 11/2007 | Higashi et al. |
| 2008/0037129 | A1 | 2/2008 | Hodgson et al. |
| 2008/0055584 | A1 | 3/2008 | Pradhan et al. |
| 2008/0055716 | A1 | 3/2008 | Erdogan et al. |
| 2008/0055717 | A1 | 3/2008 | Pradhan et al. |

FOREIGN PATENT DOCUMENTS

| | | |
|---|---|---|
| WO | WO 2004/061490 A1 | 7/2004 |
| WO | WO 2004/111717 A1 | 12/2004 |
| WO | WO 2006/080422 A1 | 8/2006 |

OTHER PUBLICATIONS

A. Thelen, "Nonpolarizing edge filters; Part 2," Appl. Optics. vol. 23, pp. 3541-3543 (Oct. 15, 1984).

P. Yeh, *Optical Waves in Layered Media* John Wiley & Sons, New York, 1988, pp. v-x, 144-165, and 254-297 (38 pages).

A. Thelen, *Design of Optical Interference Coatings*, McGraw-Hill, New York, 1989, pp. v-viii, 177-196, and 250-251 (16 pages total).

R.-Y. Tsai, et al., "Comparative Study of Ultraviolet-Infrared Cutoff Filters Prepared by Reactive Electron-Beam Deposition and Reactive Ion-Assisted Deposition", Opt. Eng., May 1998, pp. 1475-1481 (7 pages).

T.R. Jensen, et al., "Environmentally Stable UV Raman Edge Filters", Society of Vacuum Coaters 43rd Annual Technical Conference Proceedings (2000) pp. 1-5 (5 pages).

H.A. MacLeod, Thin-Film Optical Filters, Third Edition, Taylor & Francis, NY, 2001, pp. vii-xi, 20-37, 46-50, 210-392 (213 pages total).

B.E. Perilloux, *Thin-Film design*, pp. i-xvi, 1-116 (SPIE Press, Bellingham Washington) (2002) (68 pages total).

M. Lequime, "Tunable thin-film filters: review and perspectives," Proc. SPIE vol. 5250, (*Advances in Optical Thin Films*, Ed. by C. Amra, N. Kaiser, H.A. McLeod) pp. 302-311 (2004) (10 pages).

P.W. Baumeister, *Optical Coating Technology*, SPIE Press, Bellingham WA, 2004, pp. v-xviii, "5-41"—"5-43", "7-76"—"7-77", "8-11"—"8-17", and "10-9"—"10-13" (33 pages total).

German Cancer Research Center Office of Technology Transfer, *Technology Offer* "Device for tuning of color beam splitters (P-382)," Apr. 2009 (2 pages).

Wang "Constrain of Coating Thickness on LaserMux," Semrock Memorandum (Jan. 9, 2007) and Attachment #1: Newport Tutorials entitled "Gaussian Beam Optics Tutorial" (Dec. 17, 2008) (6 pages total).

D.S. Kliger, *Polarized Light in Optics and Spectroscopy*, pp. v-vii, 27-58 and 237-274 (Academic Press, Inc. Boston, MA) (1990) (40 pages total).

T. Baur "A New Type of Beam Spitting Polarizer Cube" (Meadowlark Optics, Inc.) (2005) (9 pages total).

"Basic Polarization Techniques and Devices" (Meadowlark Optics, Inc.) (2005) (7 pages total).

H. Fabricius et al., "Optimizing the phase retardation caused by optical coatings," Advances in Optical Thin Films III, Ed. By N. Kaiser et al., Proc. Of SPIE vol. 7101, (2008) pp. 71011I-1-71011I-12 (12 pages total).

H. Fabricius, "Synthesis andfunctioning of SMART coatings for application in compact instruments and sensors," DOPS-Nyl Jan. 2001, (2001) p. 28-38 (The Quarterly Journal of the Danish Optical Sociery) (11 pages total).

Software Spectra, *TFCalc Thin Film Design Software for Windows, Ver. 3.5* (1985-2002) (Portland, OR) (144 pages total).

K.V. Popov et al., "Broadband high-reflection multilayer coatings at oblique angels of incidence," Apr. 1, 1997, vol. 36, No. 10, Applied Optics, pp. 2139-2151 (1997) (13 pages total).

A.V. Tikhonravov, "Some theoretical aspects of thin-film optics and their applications," Oct. 1, 1993, vol. 32, No. 28, Applied Optics, pp. 5417-5426 (1993) (10 pages total).

\* cited by examiner

OPTICAL THIN-FILM POLARIZING BANDPASS FILTER

CROSS REFERENCE TO RELATED APPLICATIONS

This application claims the benefit of U.S. Provisional Application No. 61/161,984, filed Mar. 20, 2009, the contents of which are incorporated herein by reference.

DESCRIPTION

1. Field

This disclosure relates to materials, components, and methods directed to the fabrication and use of polarizing bandpass filters.

2. Background

Often it is useful to isolate a polarization state of light or other radiation in a system. For example, and without limitation, many interferometric and spectroscopic systems are sensitive to light polarization. In addition, some detectors in optical systems are highly sensitive to light polarization. Polarization can even play a role in laser-based cutting, for example, in which the shape of the cutting region becomes highly anisotropic when polarized light is used. Linear or even elliptical (including circular) states of polarization can be obtained using a "polarizer," or a component that transmits an identified state of polarization while absorbing, reflecting, or deviating light with an orthogonal state of polarization to that state identified. A perfect polarizer exhibits 100% transmission of the desired state of polarization and complete extinction of the undesired state. Real polarizers exhibit less than 100% transmission of the desired state and incomplete blocking of the undesired state. Often the most important parameter that describes a polarizer is the "contrast ratio," or the ratio of the transmission through a pair of identical aligned polarizers to that through the same pair of polarizers with their polarization axes crossed. The inverse of the contrast ratio is called the "extinction ratio." Conventional contrast ratios can vary from less than 100:1 to as high as 100,000:1. (As used herein, the value of base 10 logarithms of the contrast ratio or, equivalently, $-1 \times$ base 10 logarithm of the transmission of a filter (measured between 0 and 1), is referred to as "Optical Density" or "OD.")

Often, it is also useful to isolate a certain wavelength band of light in the system. For example, often it is desirable to configure a system such that a detector that is intended to detect only certain wavelengths receive as input only a narrow range of wavelengths, while eliminating, as input to the detector, as much light at other wavelengths as possible, as such other light is considered "noise." Optical components that isolate one or more bands of wavelengths are called "bandpass filters." The width of the band for conventional near-UV, visible, and near-IR optical bandpass filters can range from less than 1 nm to a few nm (or less than about 1% of the center wavelength of the band) for so-called "narrowband" filters to several tens of nm (about 1 to 10% of the center wavelength) for most bandpass filters—such as those used in fluorescence detection and imaging systems. Some bandpass filters can even be several tens of % of the center wavelength wide. Filters much wider than several tens of % are possible, but are not typically referred to as bandpass filters. The blocking might cover only a limited range of wavelengths on either side of the band, or it might cover a very wide range of wavelengths. For example, a bandpass filter designed to transmit the laser line of a semiconductor laser but block the broader spontaneous emission noise on either side of the laser line needs to block light only over the range of spontaneous emission—typically about 100 nm—and thus might have a limited range of blocking. However, a bandpass filter used in front of a silicon-based detector (such as a photodiode or CCD camera) often needs to cover the entire range of sensitivity of the detector—from the UV up to about 1100 nm. The level of blocking is also application dependent—in some cases an OD of 2 to 4 is sufficient, but for applications like fluorescence spectroscopy and imaging, where the signal can be many orders of magnitude smaller than the excitation light intensity as well as surrounding ambient light noise, often an OD of 6 or even higher is necessary.

Conventionally, in order to achieve both a polarization function and a bandpass filtering function, it has been necessary to use two separate optical components: a polarizer and a bandpass filter.

Considering first the polarization function, one common type of polarizer is a stretched polymer film polarizer, which may be understood as a function of the charge conduction. For example, an array of aligned polymers that efficiently conduct charge is understood to substantially absorb light with its electric field vibrating in the direction parallel to the alignment direction of the polymers, and to transmit light with its electric field vibrating in the orthogonal direction. The result of the interaction is that the transmitted light is linearly polarized in the direction orthogonal to the alignment direction of the array of stretched polymers.

For exemplary purposes only, other types of conventional polarizers include: a metal-based wire-grid polarizer used for the visible and NIR ("near infra-red") wavelength regions; a "POLARCOR" linear polarizer, which utilizes absorption from aligned silver nano-particles in glass; a dichroic sheet polarizer, constructed by laminating a thin, stretched, and dyed polymer film between two polished, antireflection-coated glass windows, which—similar to the stretched polymer film polarizers—are based on preferential absorption of one linear polarization; a birefringence-based crystal polarizer, which is most commonly made with calcite crystals, but may also made with BBO and $YVO_4$ crystals, including Glan-Laser and Glan-Thompson polarizers. A Glan-Thompson polarizer utilizes epoxy to bond together two birefringent prisms, whereas a Glan-Laser polarizer uses an air-space between the two prisms to enable higher laser damage thresholds. These polarizers operate on the principle that the light is incident at certain angles of incidence on the two interfaces formed by a gap between two identical birefringent crystals. In a Glan-Thompson polarizer these angles are sufficiently large that p-polarized light is totally internally reflected and thus rejected, whereas s-polarized light is transmitted. In a Glan-Laser polarizer, these angles are near or equivalent to Brewster's angle for p-polarized light, which is therefore highly transmitted, whereas s-polarized light is totally internally reflected and thus highly rejected. There are also other types of birefringent polarizers, all of which operate on the principle that light rays of one polarization—incident upon birefringent material—will be deviated from rays of the orthogonal polarization.

As a further example, optical thin-film polarizers are understood to achieve discrimination using interference from a dielectric optical thin-film coating. These polarizers operate near the edge of a "stop band" region of high reflection (as may result from a quarter-wave stack of layers, or a nearly quarter-wave stack of layers). For example, when an optical thin-film polarizer is used at an oblique angle of incidence ("AOI"), the performance for each plane of polarization differs. For a quarter-wave (QW) stack consisting of multiple layers with each layer having optical thickness equal to a quarter-wavelength of some reference wavelength and refractive index alternating between a high and a low value, the most prominent difference appears close to edge of the fundamental stop band (the highly reflective region approximately centered on the reference wavelength). While the effective phase thickness at an oblique angle is independent of polarization, the width of the fundamental stop band for p-polarized light becomes narrower, while the width of the fundamental stop band for s-polarized light becomes wider, such that each edge of the stop band "splits." Such a "split" is illustrated in FIG. 1. Curve 100 (solid line) is an exemplary stop band associated with light at normal incidence on a QW stack. Curves 110 (dashed line) and 120 (dotted line) illustrate the same stop band for light incident at 45 degrees on the QW stack. In changing the AOI from 0 degrees to 45 degrees, the stop band (curve 100) shifts toward shorter wavelengths, and becomes narrower for p-polarized light (dashed curve 110 depicting a fundamental p-polarized stop band 107 bounded by cut-off wavelength 102 and cut-on wavelength 101) and wider for s-polarized light (dotted curve 120 depicting a fundamental s-polarized stop band 117 bounded by cut-off wavelength 112 and cut-on wavelength 111). As used herein, the width of the fundamental stop band is defined as the difference between the corresponding cut-on and cut-off wavelengths. Moreover, as used herein, the cut-on (cut-off) wavelength is defined as the first wavelength above (below) the reference wavelength that reaches 50% transmission. Also, it should be noted that the spectrum associated with a QW stack comprised of exactly quarter-wavelength-thick layers exhibits significant "ripple," or rapid variation of the transmission, in the regions outside the stopband, which is not illustrated in FIG. 1. This ripple can be almost eliminated by optimizing the layer thicknesses as described in U.S. Pat. Nos. 7,068,430 and 7,123,416, both herein incorporated by reference, resulting in layers that are approximately, but not exactly, a quarter-wavelength thick. Herein, the term "QW stack" is understood to include both stacks of exactly quarter-wavelength-thick layers and stacks that have been optimized to eliminate ripple outside the stopband and are thus comprised of approximately quarter-wavelength-thick layers.

Within the above described split, there is a narrow range of wavelengths for which there is both high-transmission of p-polarized light (just outside the stop band for p-polarized light) and high reflection/attenuation of s-polarized light (just inside the stop band for s-polarized light). Beyond the cut-on edge of the fundamental stop band for s-polarized light, the plate polarizer generally has high transmission for both polarizations. Coatings that achieve such an effect can be applied to a single substrate (a so-called "plate polarizer") or to the hypotenuse of a right-angle prism, which when combined with a second such prism, create a cube (a so-called "cube beamsplitter polarizer").

Many conventional polarizers are understood to exhibit limited contrast ratios. For example, a metal-based wire-grid polarizer used for the visible and NIR wavelength regions will typically have a contrast ratio of about a few hundreds-to-one. The typical contrast ratio for polymer-based linear polarizers is typically less than a few thousands-to-one at best. A "POLARCOR" linear polarizer can achieve a contrast ratio of up to 10,000:1. A dichroic sheet polarizer can exhibit a contrast ratio up to 10,000:1. Birefringence-based Calcite crystal polarizers, including Glan-Laser and Glan-Thompson Calcite polarizers, can also achieve contrast ratios better than 100,000:1. All of these examples achieve polarization discrimination either by preferential absorption or by birefringence. In addition, commercially available thin-film-based plate polarizers and cube beamsplitters have contrast ratios from a few hundreds-to-one up to about 1000:1.

Moreover, conventional polarizers known to exhibit high contrast ratios are understood to have limited acceptance angles. For example, birefringence-based polarizers, which are known to offer the highest contrast ratios available, operate with high contrast and simultaneously high transmission of the desired polarization over only a narrow range of angles of incidence. In other words, there exists a trade-off between contrast ratio and acceptance angle. Typical acceptance angles (as used herein, the half-angle, measured from the nominal AOI) can range from less than about 10 degrees for Glan-Thompson polarizers to less than 1 to several degrees for Glan-Laser polarizers. The reason for this limitation in Glan-Laser polarizers, for example, is that at lower AOIs the s-polarized light is no longer totally internally reflected, whereas at higher AOIs the transmission of the p-polarized light decreases substantially. As a result, some of the light outside of the acceptance angle range is transmitted as unpolarized light, and some of the light outside of the acceptance angle range is reflected as unpolarized light. This behavior can present problems in systems where even small amounts of signal light or stray light are present at higher angles of incidence, since the undesired polarization leaks through.

In addition, conventional polarizers known to exhibit high contrast ratios are understood to have limited clear apertures. Again, birefringence-based polarizers have maximum clear apertures substantially less than 1 inch (typically 15 mm maximum), due to the difficulty and cost of producing high-quality, uniform, single-crystal Calcite.

Moreover, conventional polarizers offer poor control over beam deviation: All non-thin-film based polarizers (those based on selective absorption and birefringence) have limited control over the transmitted wavefront of an optical beam, and in particular tend to cause the beam to deviate from the optical axis. Most conventional polarizers cannot achieve a specification of better than one to several arc minutes of beam deviation.

Further, conventional polarizers do not offer convenient collection of the orthogonal polarization. For example, in many systems it is desirable not only to eliminate one polarization of light to achieve a polarized transmitted beam, but to split the light into two orthogonal polarizations. This function cannot be performed with polarizers based on absorption of the undesired, orthogonal polarization. Such "polarizing beamsplitters" are possible with birefringent and thin-film-interference-based polarizers. However, for birefringent polarizers, in general the deviation angle of the orthogonal polarization is an unusual angle determined by the birefringence of the prisms and the index of refraction—rarely if ever can it be made to equal 90 degrees, which is a convenient angle for the compact alignment of an optical system. Thin-film polarizers can be designed to be used a 45 degrees AOI, thus deviating the orthogonal light 90 degrees, both in plate and cemented (or air-spaced) right-angle prism cube configurations.

A paper which discusses development of optimization strategy for dielectric thin-film coatings, and which further discloses an example of a thin-film polarizing beamsplitter and mirror is H. Fabricius, "*Synthesis and functioning of SMART coatings for application in compact instruments and sensors,*" DOPS-Nyt 1-2001, p. 28-38, 2001 (The Quarterly Journal of the Danish Optical Society). This paper discloses, in part, the use of merit function optimization in the design of thin-film coatings. In particular, this paper discloses use of a linear summation merit function to include different properties of a thin film coating. This paper also discloses application of the first-order optimization technique (simplex) and the second-order optimization technique (Newton) for coating design—which includes calculation of up to the second-order derivative of the disclosed merit function. As acknowledged in the paper, however, it becomes increasingly difficult, if not impossible, to guess at a suitable initial structure in order to arrive at a final coating with complex functionalities. For a coating that is intended to exhibit complex functionality, referred to as SMART coatings, the paper suggests that a synthesis technique rather than optimization technique is needed. To that end, the paper discloses and applies the so-called "needle-synthesis" technique, developed by A. V. Tichonravov. Pursuant to this technique, a designer conventionally starts with a single thick layer. Then, one or more near zero-thickness layers, so-called "needle layers," are inserted into the coating design. The position at which a needle layer is inserted may be selected according to whether the value of a function (which is connected to a derivative of the merit function) is less than zero at that position. Once inserted, optimization routines may be used to improve the design. As a result, the thicknesses of these needle layers are allowed to grow if helpful to improving the design. Under the needle-synthesis technique, the process is repeated until the design meets the requirement or some other termination criterion. Depending upon the design requirements or termination criterion, accordingly, the resulting structure can include a wide diversity of layer thicknesses—including many relatively thick layers and many relatively thin layers. The paper discloses a thin-film polarizing beamsplitter designed by application of the needle-synthesis technique, second-order optimization of the reflection and the transmission in the spectral range from 600 nm to 740 nm, and is based on a material set of $TiO_2$ and $SiO_2$. The resulting polarizing beamsplitter is disclosed as having a layer count of 53. At 45 degrees AOI, the paper discloses that the filter exhibits high transmission for p-polarization from 620 nm to about 640 nm, and exhibits less than 1% transmission for s-polarization over the same wavelength range. The design of the polarizing beamsplitter disclosed in the paper further achieves a contrast ratio of approximately 1000:1, and requires approximately 10 nm for the p-polarization edge to change from 90% transmission to 0.1%. The out-of-band blocking exhibited by the disclosed polarizing beamsplitter extends from 600 nm to 740 nm.

It is desirable, however, for a combined polarizing bandpass filter to exhibit a contrast ratio over 1,000,000:1, to exhibit steep edges, and to exhibit extended blocking over a wide range of wavelengths. Moreover, a design which includes a wide diversity of layer thicknesses—including many relatively thick layers and many relatively thin layers—is more difficult to manufacture than, for example, a design made up entirely of approximate quarter-wave thick layers. Further, when designing a polarizing bandpass filter intended to exhibit such specific, combined, complex functionalities, it is desirable to utilize a technique that allows for smaller perturbations in the design steps than that permitted by the needle-synthesis technique.

Furthermore, polarizers are understood to have limited transmission of p-polarized light: Most polarizers, especially those based on absorption, have difficulty achieving transmission of even 90% (for the best, dichroic sheet polarizers). Thin-film and birefringence-based polarizers can achieve transmission above 90%, but generally, at best, no more than between 90 and 95%. For birefringence-based polarizers, such as the Glan-Laser polarizers, s-polarized light must be totally reflected, which occurs over a particular range of angles, and generally the Brewster's angle where p-polarized light is completely transmitted does not coincide with this range of angles, thus limiting the transmission of the desired p-polarized light.

Further still, polarizers are understood to have limited laser damage thresholds (LDT). Most polarizers cannot withstand continuous-wave (cw) laser intensities in excess of about 1 $W/cm^2$, nor can most polarizers withstand pulsed laser energy densities (for low repetition rate, ~10 ns pulses) above $nJ/cm^2$. Certain polarizers specially designed to have no absorptive materials in the laser path, such as Glan-Laser Calcite polarizers, can have higher LDT values (up to $kW/cm^2$ for cw lasers and $J/cm^2$ for pulsed lasers).

Yet further, polarizers typically have poor physical durability and optical quality. Most absorption-based polarizers are based on plastics or hybrid glass-plastic laminated structures, and thus have limited environmental durability. Furthermore, birefringent crystal polarizers have limited durability since crystals like calcite are very soft and easily cleave or break. These components also tend to have limited optical quality, since defects in bulk crystals like calcite lead to bubbles, striae, and other optical inhomogeneities, which cause degradation of the polarization, transmission loss due to scattering, and distortion of an optical beam, especially when used for imaging applications.

More information on polarizers can be found in numerous text books (such as Polarized Light in Optics and Spectroscopy, by David S. Kliger and James W. Lewis, Academic Press, 1990) or internet-accessible on-line resources that describe available products (such as the website of Meadowlark Optics, Inc.).

Considering next a conventional bandpass filtering function, thin-film bandpass filters capable of performing bandpass filtering functionality have been previously described in, for example, U.S. Pat. No. 6,809,859, which disclosure is incorporated herein in its entirety by reference. For example, filter 1900 illustrated in FIG. 19 includes a long-wave-pass filter 1902 deposited directly on a first surface 1904 of a colored glass substrate 1906 and a short-wave-pass filter 1908 deposited directly on a second surface 1910 of the colored glass substrate. Advantageously, the filters 1902 and 1908 are each formed from "hard coatings." With reference also to FIG. 20, for example, the long-wave-pass filter 1902 may be formed by depositing alternating hard coating layers of high 2000-1, 2000-2 ... 2000-*n* and low 2002-1, 2002-2 ... 2002-*x* index of refraction material. It is to be understood that the short-wave-pass filter will have a similar construction, i.e. alternating high and low index hard coating layers. The colored glass substrate absorbs light at wavelengths well removed from the bandpass region or filter edges, and is used to extend the spectral region of high blocking (high optical density) if desired; for example, the colored glass might absorb UV wavelengths, or IR wavelengths, or both. Such substrates are commercially available from such vendors as Schott Glass Corp. Each of the layers 2000-1, 2000-2 ... 2000-*n* and low 2002-1, 2002-2 ... 2002-*x* has an associated optical thickness, defined by the product of its physical thickness times its refractive index. Although the embodiments shown in the drawings are not drawn to scale, the hard coating layers illustrated in FIG. 19 may be, for example, one quarter wavelength in optical thickness. Depending on desired transmission characteristics, however, non-quarter-wave optical thicknesses and/or varying optical thicknesses may also be provided.

Bandpass filters are not known to function as polarizers. Specifically, bandpass filters are not known to offer any substantial polarization contrast. As a result, and as stated above, optical systems that require both bandpass and polarizer functionality at the same location have used at least two separate components, leading to increased optomechanical system complexity (additional mounting requirements, alignment considerations, stray-light control problems, etc.), lower overall transmission, increased system weight, and, as a result, increased overall cost (because of the need for multiple components as well as the increased complexity and weight).

Accordingly, there is a need to provide a solution for systems and operations that benefit from both a polarizing function and a bandpass filtering function with reduced system complexity, increased transmission, and/or decreased system weight.

SUMMARY

In an embodiment consistent with the present disclosure, the above need can be achieved by the manufacture and use of an optical thin-film filter that operates at an oblique angle of incidence and exhibits high transmission of light with p-polarization and simultaneously deep attenuation of light with s-polarization within a certain wavelength range, with a p-to-s polarization contrast ratio better than 1,000,000:1. Outside of the same wavelength range, materials and components consistent with the present disclosure exhibit deep blocking—better than optical density (OD) 6—for light with all states of polarization. The blocking region can be further expanded by the use of extended blocking, as previously described in U.S. Pat. No. 6,809,859, incorporated herein above by reference, to enhance performance and/or incorporate additional desirable functionality. Therefore, materials and components consistent with the present disclosure function as both a bandpass filter for p-polarization and a broadband blocking filter for s-polarization.

Materials and components consistent with the present disclosure are configured to function as a polarizer with a very high contrast ratio between the desired state of polarization and the undesired state of polarization. Furthermore, materials and components consistent with the present disclosure also are configured to function as a bandpass filter, simultaneously and/or cooperatively with its function as a polarizer.

Materials and components consistent with the present disclosure comprise two QW stacks, configured such that the cut-on wavelength of the fundamental stop band for s-polarization associated with the first QW stack is approximately equal to or longer than the cut-off wavelength of the fundamental stop band for s-polarization associated with the second QW stack, and thereby configured such that a bandpass filter is formed for p-polarization while light with s-polarization is blocked inside this passband subject to a relatively high contrast ratio.

Furthermore, materials and components consistent with the present disclosure comprise two QW stacks configured as described above and further configured using conventional optimization routines known to those skilled in the art of thin-film design (such as TFCalc) to—among other things and without limitation—optimize the layer structure to further improve transmission and also to minimize passband ripple for p-polarization.

Consistent with the present disclosure, two thin-film QW stacks 2102 and 2108 as configured above can be deposited on the opposite sides of a single substrate 1906 as depicted in FIG. 21. They can also be deposited on the same side of substrate 1906 as a single coating consistent with the present disclosure. The single-sided coating approach of FIG. 22 eliminates beam walk-off between light reflected from opposite sides of the substrate. It also makes it possible to leave the uncoated side of the substrate 1906 available for another coating to further enhance the performance (e.g., an antireflection coating) or to provide additional functionality. In one embodiment consistent with the present disclosure, as shown in FIG. 23, the second side of the substrate is coated with an extended blocking coating 2300, as previously described in U.S. Pat. No. 6,809,859, herein above incorporated by reference, to further expand the blocking region. For exemplary purposes only, a typical Si photodiode has a sensitivity to wavelengths spanning from the UV up to about 1100 nm. By applying an extended blocking coating 2300 to cover the entire range of sensitivity of such a detector, the performance of materials and components consistent with the present disclosure is further enhanced in connection with such an exemplary Si photodiode. As a further example, and without limitation, it can be desirable to suppress the residual intensity from additional laser wavelengths or wavelength harmonics present in a system, such as the 1064 nm fundamental wavelength of a frequency-doubled 532 nm Nd:YAG laser. Consistent with the present disclosure, this can be achieved by designing the coating on the second side of the substrate as illustrated in the exemplary 532 nm filter as discussed further below.

Additional functionality—such as resistance to substrate bending—can also be provided through the application of such a coating on the second side of a substrate. By way of example only, coatings that are generated using energetic ion-beam sputtering processes typically exhibit a relatively high compressive stress. Such stress in the coating can further cause bending of the substrate. For imaging applications, and when applied to a reflected beam, bending of the underlying substrate in the filter can contribute to the wavefront error and degradation of the image quality. When applied to a transmitted beam, the effect of an underlying bent substrate in a filter component is equivalent to an effective substrate wedge, which can give rise to beam deviation. Consequently, it can be desirable to minimize substrate bending. Consistent with the present disclosure, a coating on the second side of the substrate, which can provide enhanced performance and/or additional functionality, also can be configured to balance the coating stress on the underlying substrate from the first side—where a polarizing bandpass filter consistent with the present disclosure may be deposited. In one embodiment, the coating on the second side is configured to exhibit a coating stress on the underlying substrate that matches the coating stress from the first side. Consistent with the present disclosure, such a balanced design strategy can reduce substrate bending and minimize reflected wavefront error in reflection and beam deviation in transmission. The performance of materials and components consistent with the present disclosure may be further enhanced by selecting a quality glass substrate, chosen to have a very small substrate wedge, as previously described in U.S. Pat. No. 7,411,679, herein incorporated by reference. As described herein and utilizing a balanced design approach and a glass substrate with a wedge less than 4.4 arc second, materials and components consistent with the present disclosure can achieve less than 10 arc seconds beam deviation over the entire range of their operation.

As described herein, in an embodiment, materials and components consistent with the present disclosure combine the functions of a polarizer and bandpass filter in a single component utilizing a single substrate of glass with one or both sides coated with numerous discrete multi-layer thin films. The thin film layers may be deposited using any of a number of conventional thin-film deposition techniques capable of making highly multi-layer optical coatings, such as ion-assisted ion-beam sputtering.

Materials and components consistent with the present disclosure can be a valuable component in any optical system that requires isolation of a single-state of polarization and a band of wavelengths of light. Without limitation, examples of systems that can benefit from materials and components consistent with the present disclosure include: (a) fluorescence detection systems as described below; (b) laser clean-up filters; (c) laser communication detection systems; (d) harmonic-generation imaging systems; and (e) polarization and wavelength multiplexing systems.

For example, a fluorescence detection system which measures the degree of polarization of fluorescence emission can benefit from the present disclosure. Such measurements can indicate whether or not one chemical species binds to another species with a fluorescent label attached. By way of example only, a polarized excitation source can excite a certain orientation (dipole moment) of a fluorescent molecule under study. Ideally, such an excited molecule would also emit polarized fluorescence, except that such molecules may be very quickly "depolarized" due to motion. However, when another species binds to the labeled target, the target becomes much less mobile so that the degree of polarization of the emitted light increases (i.e., the degree of "depolarization" of the labeled target is reduced). Consequently, valuable information can be obtained by measuring the degree of polarization of the target as a function of time. This technique is known to be used in both high-speed fluorescence detection (so-called microplate readers) as well as in microscopy.

Furthermore, a complete laser clean-up filter can benefit from the present disclosure by passing a single, desired polarization output from a laser at the desired laser wavelength while blocking both light at the laser wavelength of the orthogonal polarization as well as light of all polarization states at wavelengths adjacent to the laser line. The blocked light is considered "noise" in systems based on such lasers, and the better these noise sources can be blocked, the better the signal-to-noise ratio of the system.

Moreover, a laser communication detection system can benefit from the present disclosure, where such a system is designed to receive a laser-based signal of a single polarization, in which it is useful to block incident light at wavelengths other than the laser wavelength (such as ambient light from the sun and other sources), as well as undesired orthogonally polarized light at the laser wavelength. In such systems, for example, a large ratio between filter transmission and blocking, as well as a high polarization contrast ratio, lead directly to improved signal-to-noise ratio of the communication system.

Further, a harmonic-generation imaging system, such as may be used for material characterization or biological research, can benefit from the present disclosure. For example, in second-harmonic-generation (SHG) microscopy for biological imaging, a laser may be used to illuminate a sample of interest (e.g., at around 810 nm), and a microscope may be used to collect and image the light at one half of the illumination wavelength (e.g., at around 405 nm). The efficiency of the SHG process can benefit from the present disclosure. For example, the polarization dependence can be used to determine unique characteristics of the biological material not easily measurable with standard or even fluorescence microscopy. Moreover, high-fidelity images require isolation of the frequency-doubled wavelength as well as relatively high polarization contrast from a component that does not distort the high-quality imaging path.

Further still, a simultaneous polarization and wavelength multiplexing system can benefit from the present disclosure. For example, high-power laser applications such as laser materials processing can be limited by power scaling characteristics of the laser—in which obtaining higher and higher total power may sacrifice brightness (where brightness is the power per unit area, per unit wavelength interval, per unit beam solid angle). One way to increase brightness is to combine many laser beams together, each with a slightly different wavelength (so-called "wavelength multiplexing"), and using two orthogonal polarizations at each wavelength (so-called "polarization multiplexing"). Materials and components consistent with the present disclosure are ideal components for achieving simultaneous polarization and wavelength multiplexing.

A polarizing bandpass filter (PBF) consistent with the present disclosure may be used at an oblique AOI, such as 45 degrees, where for many applications only the transmitted light is of interest. There will, however, also be a reflected beam, deviating from the transmitted beam by two times the angle of incidence, or 90 degrees in the case of a filter used at a 45 degree AOI. Thus, a PBF consistent with the present disclosure can act like a beamsplitter for some applications—where it transmits p-polarization within a band and reflects s-polarization within the same band. Consequently, some applications can also take advantage of this reflected beam, even though the reflected beam, while primarily s-polarized, may also contain p-polarized light (that is, it may contain approximately 1% of the p-polarized incident light), and thus may not have the same s-to-p contrast ratio in the reflected beam as the p-to-s contrast ratio in the transmitted beam. However, if a second PBF consistent with the present disclosure is used in series in the reflected path of the first PBF consistent with the present disclosure, aligned so that the s-polarization reflected off of the first PBF becomes p-polarization when transmitted through the second PBF consistent with the present disclosure, then the combination of the two PBFs can yield two output beams containing the orthogonal polarizations of the input beam and with greater than 1,000,000:1 contrast ratio for both beams. For the simultaneous polarization and wavelength multiplexing system, a PBF consistent with the present disclosure acts like a beam combiner.

Additional features and advantages will be set forth in part in the description which follows, being apparent from the description of or learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the scope of the embodiments, as claimed.

BRIEF DESCRIPTION OF THE DRAWINGS

The accompanying drawings, which are incorporated in and constitute a part of this specification, illustrate embodiments and, together with the description, serve to explain the features, advantages, and principles of the disclosed embodiments.

DETAILED DESCRIPTION

Reference will now be made in detail to the one or more embodiments, characteristics of which are illustrated in the accompanying drawings. Wherever possible, the same reference numbers will be used throughout the drawings to refer to the same or like parts.

Figure 1:
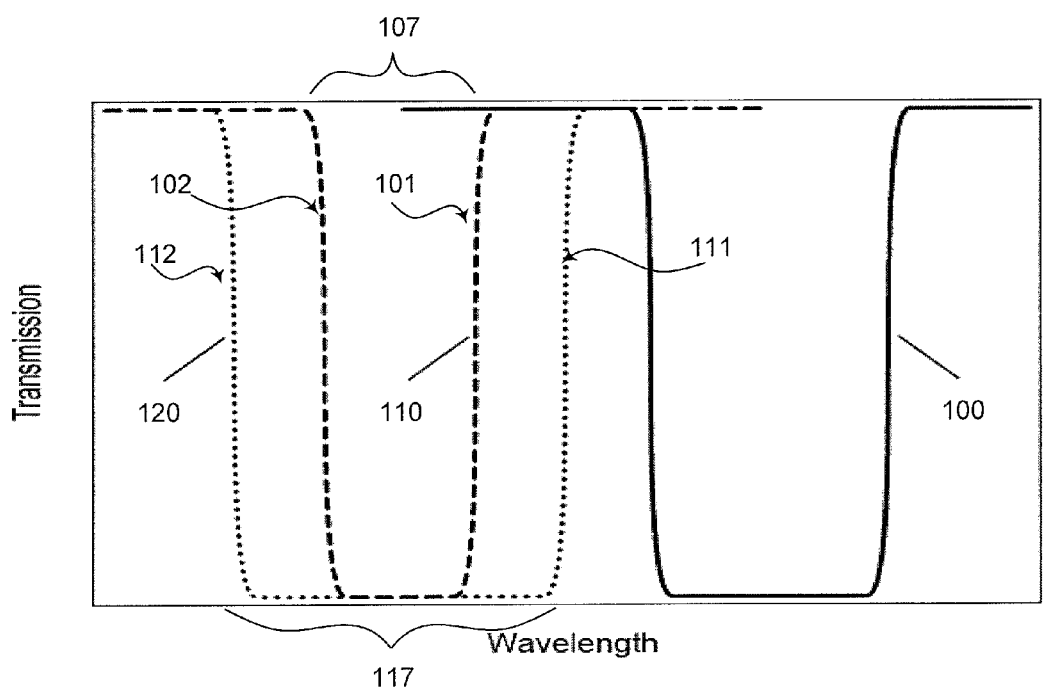
FIG. 1 is an exemplary illustration of an edge split associated with light at an oblique AOI on a QW stack.

As has been described above in connection with FIG. 1, when light is incident on a thin-film at an oblique AOI the performance for each plane of polarization differs from that for a normal AOI. Specifically, while the effective phase thickness at an oblique angle is independent of polarization, the width of the fundamental stop band for p-polarized light can become narrower (curve 100 to curve 110), while the width of the fundamental stop band for s-polarized light can become wider (curve 100 to curve 120). Again, as used herein, the width of the fundamental stop band is defined as the difference between the corresponding cut-on and cut-off wavelengths. Moreover, as used herein, the cut-on (cut-off) wavelength is defined as the first wavelength above (below) the reference wavelength that reaches 50% transmission.

Figure 2:
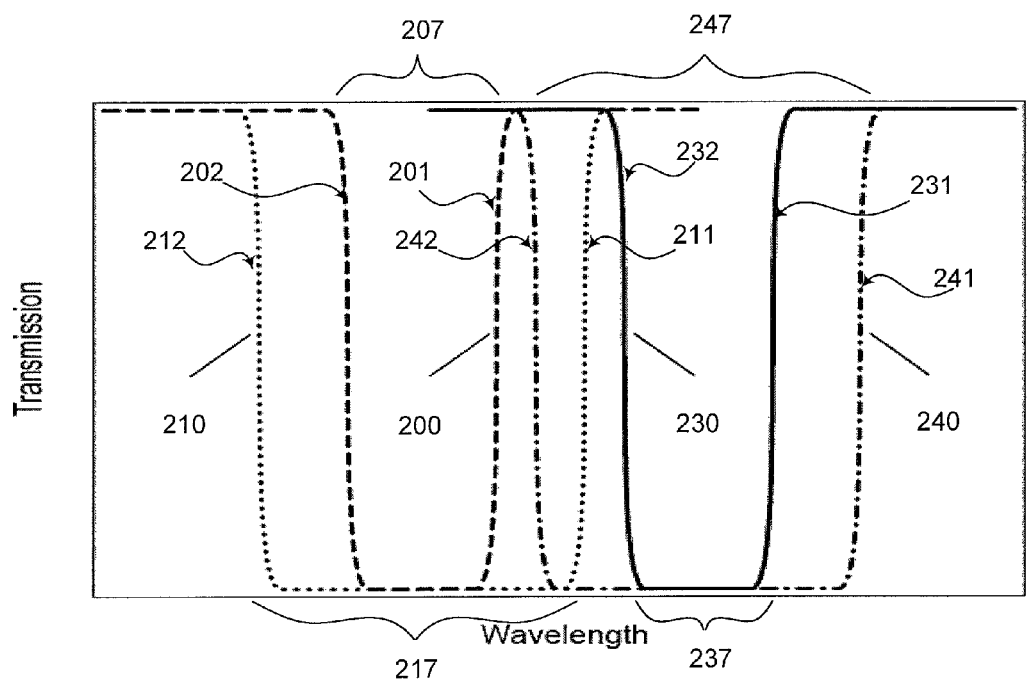
FIG. 2 is an exemplary illustration of two different stop bands associated with light at a 45° AOI from two different thin-film coatings or from two different portions of the same thin-film coating consistent with an embodiment of the present disclosure.

Materials and components consistent with the present disclosure exploit this performance difference. For example, FIG. 2 illustrates two different stop bands (each stop band including both a fundamental s-polarization stop band and a fundamental p-polarization stop band) associated with light incident at 45 degrees from two different thin-film coatings or from two different portions of the same thin-film coating consistent with the present disclosure. Specifically, and for exemplary purposes only, referring to the two different thin-film coatings or two different portions of the same thin-film coating as a first QW stack 2102 and a second QW stack 2108, dashed curve 200 is an exemplary p-polarization transmission characteristic for the first QW stack 2102 (with a first fundamental stop band for p-polarization 207 bounded by cut-off wavelength 202 and cut-on wavelength 201), dotted curve 210 is an exemplary s-polarization transmission characteristic for the first QW stack 2102 (with a first fundamental stop band for s-polarization 217 bounded by cut-off wavelength 212 and cut-on wavelength 211), solid curve 230 is an exemplary p-polarization transmission characteristic for the second QW stack 2108 (with a second fundamental stop band for p-polarization 237 bounded by cut-off wavelength 232 and cut-on wavelength 231), and dotted-dashed curve 240 is an exemplary s-polarization transmission characteristic for the second QW stack 2108 (with a second fundamental stop band for s-polarization 247 bounded by cut-off wavelength 242 and cut-on wavelength 241). In FIG. 2, the second fundamental stop band for p-polarization 237 (associated with the second QW stack 2108) is at a longer wavelength than the first fundamental stop band for p-polarization 207 (associated with the first QW stack 2102). Consistent with the present disclosure, the cut-on wavelength 211 of the fundamental stop band for s-polarization 217 associated with the first QW stack 2102 (that is, a first stop band for s-polarization) is equal to or slightly longer than the cut-off wavelength 242 of the fundamental stop band 247 for s-polarization associated with the second QW stack 2108 (that is, a third stop band for s-polarization). In this manner, consistent with the present disclosure, a bandpass filter is formed for p-polarization—due to the relative positions of the cut-off wavelength 232 of the fundamental stop band for p-polarization associated with the second QW stack 2108 (that is, a fourth stop band for p-polarization) and the cut-on wavelength 201 of the fundamental stop band for p-polarization associated with the first QW stack 2102 (that is, a second stop band for p-polarization)—while light with s-polarization is blocked inside this passband.

Figure 3:
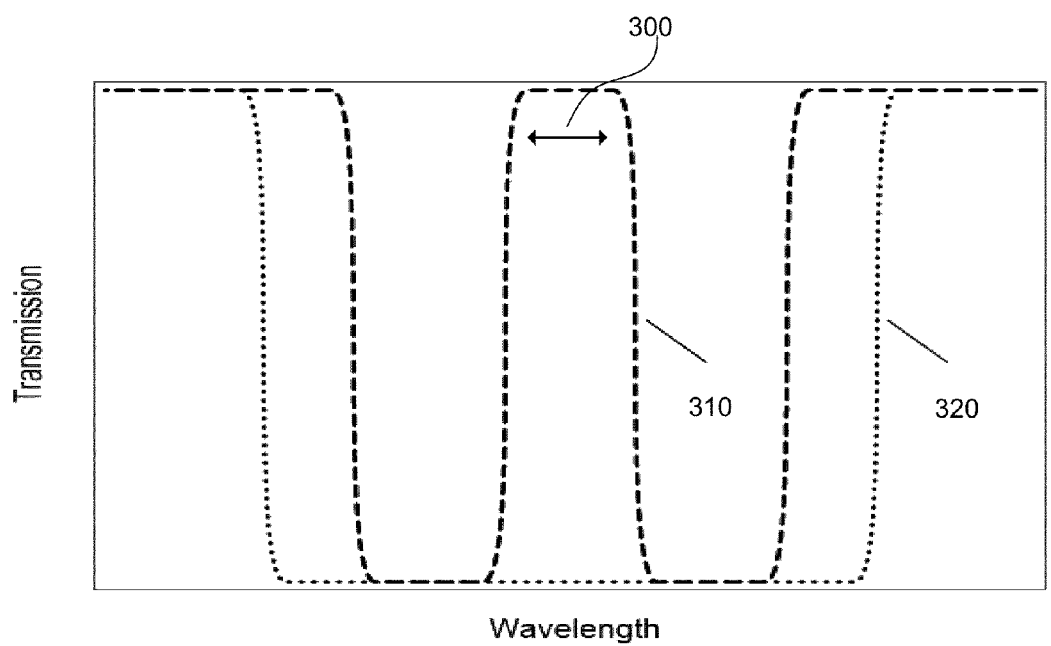
FIG. 3 is an exemplary illustration of the net result of combining the two different thin-film coatings or combining two different portions of the same thin-film coating from FIG. 2 consistent with an embodiment of the present disclosure.

Considering the first and second QW stacks described above in connection with FIG. 2 as a unitary structure, FIG. 3 depicts the net result of combining the two different coatings or portions of a coating. Specifically, FIG. 3 depicts a passband for p-polarized light (dashed curve 310) while s-polarized light is blocked over the entire passband region 300 as well as within the blocking range for p-polarized light (dotted curve 320).

Table 1 below depicts the material, sequence of layers, and layer thickness of a thin-film design of an exemplary 633 nm polarization bandpass filter consistent with the present disclosure. This design has a total coating thickness of 13.566 micrometers and a total layer count of 140. It does not incorporate an extended blocking design on the second side of the substrate. Instead, an AR coating is used.

TABLE 1

| Layer | Material | Thickness (nm) |
|---|---|---|
| 1 | $Nb_2O_5$ | 10.511629 |
| 2 | $SiO_2$ | 107.82405 |
| 3 | $Nb_2O_5$ | 74.186108 |
| 4 | $SiO_2$ | 95.459275 |
| 5 | $Nb_2O_5$ | 48.58121 |
| 6 | $SiO_2$ | 95.990325 |
| 7 | $Nb_2O_5$ | 63.937908 |
| 8 | $SiO_2$ | 107.814673 |
| 9 | $Nb_2O_5$ | 60.806319 |
| 10 | $SiO_2$ | 107.174089 |
| 11 | $Nb_2O_5$ | 60.784994 |
| 12 | $SiO_2$ | 107.23574 |
| 13 | $Nb_2O_5$ | 62.68626 |
| 14 | $SiO_2$ | 106.417737 |
| 15 | $Nb_2O_5$ | 70.891225 |
| 16 | $SiO_2$ | 106.746457 |
| 17 | $Nb_2O_5$ | 56.328244 |
| 18 | $SiO_2$ | 106.217109 |
| 19 | $Nb_2O_5$ | 58.898732 |
| 20 | $SiO_2$ | 107.039902 |
| 21 | $Nb_2O_5$ | 67.178682 |
| 22 | $SiO_2$ | 107.436006 |
| 23 | $Nb_2O_5$ | 60.100543 |
| 24 | $SiO_2$ | 106.511113 |
| 25 | $Nb_2O_5$ | 66.444396 |
| 26 | $SiO_2$ | 107.220078 |
| 27 | $Nb_2O_5$ | 66.543654 |
| 28 | $SiO_2$ | 106.999487 |
| 29 | $Nb_2O_5$ | 65.094616 |
| 30 | $SiO_2$ | 106.333156 |
| 31 | $Nb_2O_5$ | 62.297208 |
| 32 | $SiO_2$ | 107.416353 |
| 33 | $Nb_2O_5$ | 57.45066 |
| 34 | $SiO_2$ | 106.475994 |
| 35 | $Nb_2O_5$ | 56.992719 |
| 36 | $SiO_2$ | 106.675666 |
| 37 | $Nb_2O_5$ | 77.407889 |
| 38 | $SiO_2$ | 107.36145 |
| 39 | $Nb_2O_5$ | 59.970505 |
| 40 | $SiO_2$ | 106.965326 |
| 41 | $Nb_2O_5$ | 63.469101 |
| 42 | $SiO_2$ | 107.699656 |
| 43 | $Nb_2O_5$ | 72.402873 |
| 44 | $SiO_2$ | 107.085062 |
| 45 | $Nb_2O_5$ | 60.647687 |
| 46 | $SiO_2$ | 106.251434 |
| 47 | $Nb_2O_5$ | 59.818188 |
| 48 | $SiO_2$ | 106.637492 |
| 49 | $Nb_2O_5$ | 64.612124 |
| 50 | $SiO_2$ | 105.898804 |
| 51 | $Nb_2O_5$ | 54.229638 |
| 52 | $SiO_2$ | 106.360016 |
| 53 | $Nb_2O_5$ | 68.023714 |
| 54 | $SiO_2$ | 107.07246 |
| 55 | $Nb_2O_5$ | 68.151692 |
| 56 | $SiO_2$ | 106.828688 |
| 57 | $Nb_2O_5$ | 69.680628 |
| 58 | $SiO_2$ | 108.329967 |
| 59 | $Nb_2O_5$ | 69.15047 |
| 60 | $SiO_2$ | 107.333285 |
| 61 | $Nb_2O_5$ | 58.692006 |
| 62 | $SiO_2$ | 106.890455 |
| 63 | $Nb_2O_5$ | 62.129245 |
| 64 | $SiO_2$ | 106.862369 |
| 65 | $Nb_2O_5$ | 61.899899 |
| 66 | $SiO_2$ | 105.417729 |
| 67 | $Nb_2O_5$ | 50.156398 |
| 68 | $SiO_2$ | 105.20167 |
| 69 | $Nb_2O_5$ | 57.618227 |
| 70 | $SiO_2$ | 108.74548 |
| 71 | $Nb_2O_5$ | 69.643752 |
| 72 | $SiO_2$ | 136.862518 |
| 73 | $Nb_2O_5$ | 77.285109 |
| 74 | $SiO_2$ | 140.700876 |
| 75 | $Nb_2O_5$ | 82.664222 |
| 76 | $SiO_2$ | 141.126887 |
| 77 | $Nb_2O_5$ | 87.061513 |
| 78 | $SiO_2$ | 143.252888 |
| 79 | $Nb_2O_5$ | 91.04546 |
| 80 | $SiO_2$ | 142.968658 |
| 81 | $Nb_2O_5$ | 85.847561 |
| 82 | $SiO_2$ | 139.818176 |
| 83 | $Nb_2O_5$ | 82.407398 |
| 84 | $SiO_2$ | 136.405591 |
| 85 | $Nb_2O_5$ | 79.332196 |
| 86 | $SiO_2$ | 135.493958 |
| 87 | $Nb_2O_5$ | 78.104676 |
| 88 | $SiO_2$ | 139.685085 |
| 89 | $Nb_2O_5$ | 79.825172 |
| 90 | $SiO_2$ | 142.414738 |
| 91 | $Nb_2O_5$ | 83.363033 |
| 92 | $SiO_2$ | 142.97985 |
| 93 | $Nb_2O_5$ | 90.355012 |
| 94 | $SiO_2$ | 141.912028 |
| 95 | $Nb_2O_5$ | 85.758544 |
| 96 | $SiO_2$ | 138.163627 |
| 97 | $Nb_2O_5$ | 78.97733 |
| 98 | $SiO_2$ | 137.523583 |
| 99 | $Nb_2O_5$ | 77.488072 |
| 100 | $SiO_2$ | 140.615754 |
| 101 | $Nb_2O_5$ | 81.961683 |
| 102 | $SiO_2$ | 142.226302 |
| 103 | $Nb_2O_5$ | 81.727777 |
| 104 | $SiO_2$ | 141.725388 |
| 105 | $Nb_2O_5$ | 89.985913 |
| 106 | $SiO_2$ | 139.749915 |
| 107 | $Nb_2O_5$ | 86.049916 |
| 108 | $SiO_2$ | 137.324146 |
| 109 | $Nb_2O_5$ | 75.760851 |
| 110 | $SiO_2$ | 135.413425 |
| 111 | $Nb_2O_5$ | 77.200681 |
| 112 | $SiO_2$ | 139.650493 |

TABLE 1-continued

| Layer | Material | Thickness (nm) |
|---|---|---|
| 113 | $Nb_2O_5$ | 100.342915 |
| 114 | $SiO_2$ | 140.088335 |
| 115 | $Nb_2O_5$ | 75.85867 |
| 116 | $SiO_2$ | 141.013069 |
| 117 | $Nb_2O_5$ | 72.228282 |
| 118 | $SiO_2$ | 137.111591 |
| 119 | $Nb_2O_5$ | 101.656208 |
| 120 | $SiO_2$ | 137.368209 |
| 121 | $Nb_2O_5$ | 84.248349 |
| 122 | $SiO_2$ | 135.060635 |
| 123 | $Nb_2O_5$ | 68.794123 |
| 124 | $SiO_2$ | 139.726061 |
| 125 | $Nb_2O_5$ | 81.333468 |
| 126 | $SiO_2$ | 141.572455 |
| 127 | $Nb_2O_5$ | 90.661852 |
| 128 | $SiO_2$ | 140.345522 |
| 129 | $Nb_2O_5$ | 101.240754 |
| 130 | $SiO_2$ | 138.356661 |
| 131 | $Nb_2O_5$ | 73.798415 |
| 132 | $SiO_2$ | 136.397037 |
| 133 | $Nb_2O_5$ | 76.291838 |
| 134 | $SiO_2$ | 141.837171 |
| 135 | $Nb_2O_5$ | 73.060248 |
| 136 | $SiO_2$ | 148.130077 |
| 137 | $Nb_2O_5$ | 122.304111 |
| 138 | $SiO_2$ | 137.701563 |
| 139 | $Nb_2O_5$ | 66.584428 |
| 140 | $SiO_2$ | 37.252111 |

Figure 4:
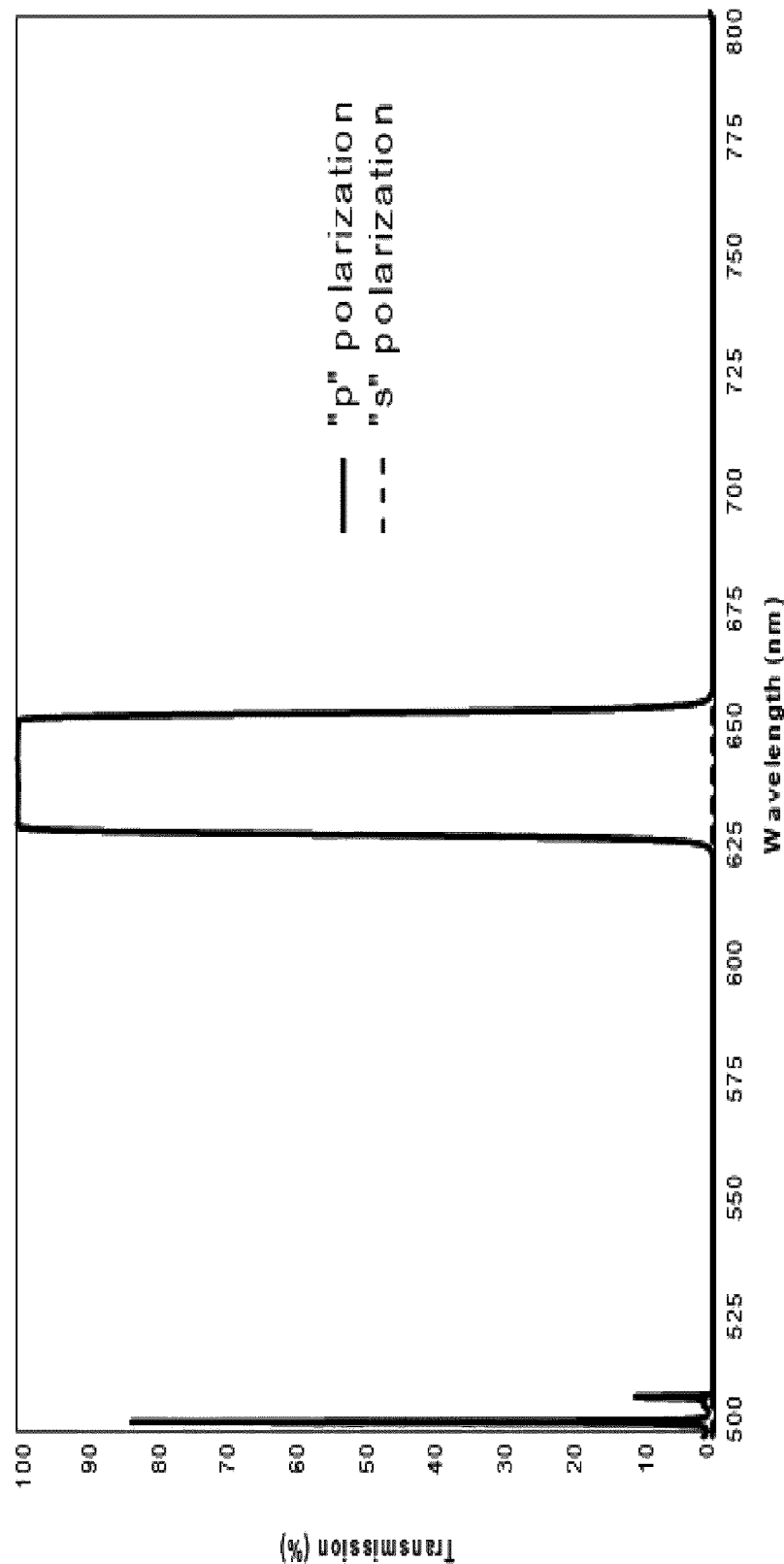
FIG. 4 depicts the calculated transmission percentage for both s-polarization and p-polarization of a 633 nm Polarization Bandpass Filter consistent with an embodiment of the present disclosure and consistent with the structure identified in Table 1.
Figure 5:
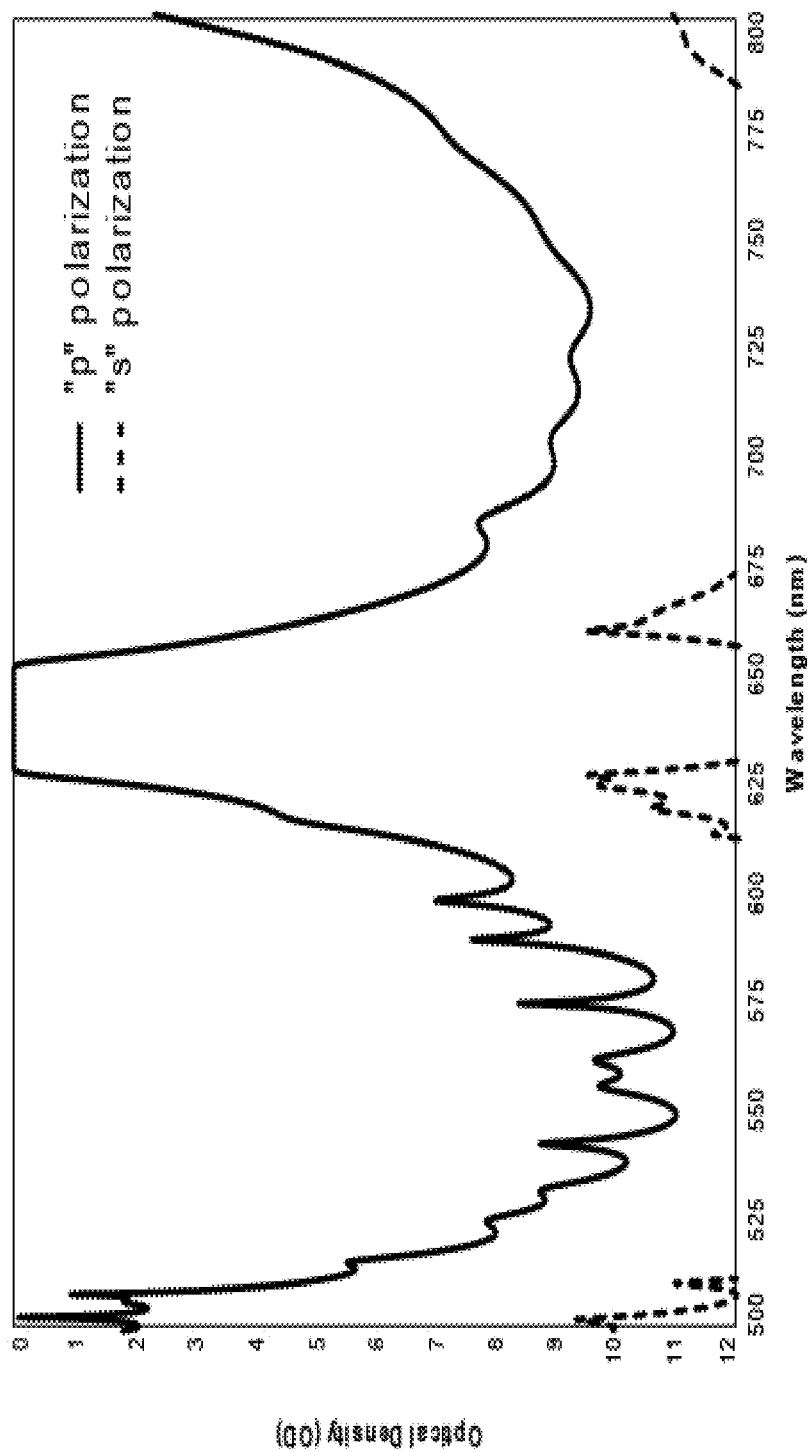
FIG. 5 depicts the calculated Optical Density (OD) for both s-polarization and p-polarization of a 633 nm Polarization Bandpass Filter consistent with an embodiment of the present disclosure and consistent with the structure identified in Table 1.
Figure 10:
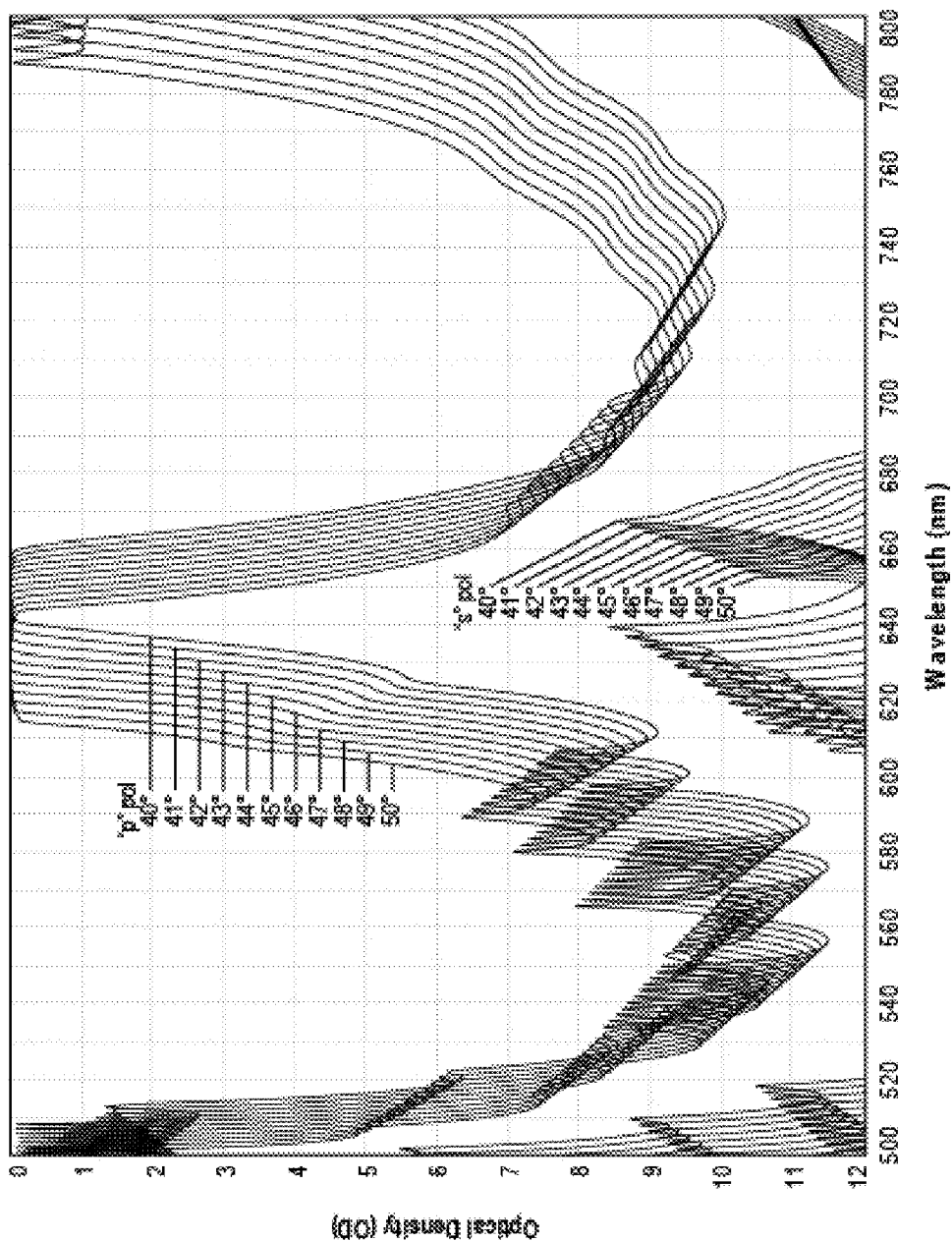
FIG. 10 depicts the calculated Optical Density (OD) for both s-polarization and p-polarization of a 633 nm Polarization Bandpass Filter consistent with an embodiment of the present disclosure and consistent with the structure identified in Table 1, with curves plotted for light incident at 11 different angles ranging from 40 to 50 degrees.

FIGS. 4, 5, and 10 depict the theoretical design spectra for p- and s-polarized light associated with the exemplary 633 nm polarizing bandpass filter of Table 1. This exemplary filter may be used, for example, as a laser clean-up filter for a 632.8 nm helium-neon (HeNe) laser, or a 635 nm diode laser, in which both polarization and spectral clean-up functions are performed. FIG. 4 depicts the calculated transmission percentage and FIG. 5 depicts the calculated OD of the structure of Table 1 for "s" and p-polarizations. FIG. 10 depicts the calculated OD for both s- and p-polarizations at 11 different angles of incidence ranging from 40 to 50 degrees. (As used herein, the 10 degree range between 40 degrees and 50 degrees illustrated in FIG. 10 corresponds to an acceptance angle range of 10 degrees, i.e., an acceptance angle of at least ±5 degrees.) The curves show that at a particular wavelength (for example 642 nm), the high transmission of p-polarization and high contrast ratio are maintained over this full angular range.

FIGS. 6 to 9 depict a comparison between the calculated characteristics depicted in FIGS. 4 and 5, and the measured characteristics of the embodiment described in Table 1 consistent with the disclosure and comprising a thin-film that was coated using an ion-assisted ion-beam sputtering deposition system. The thin-film coating method and equipment used to create the embodiment measured in FIGS. 6-9 is described in more detail in, for example, U.S. Pat. No. 7,068,430, herein incorporated by reference. The measurements on the resulting filter depicted in FIGS. 6-9 were obtained from a home-built spectrophotometer.

Figure 6:
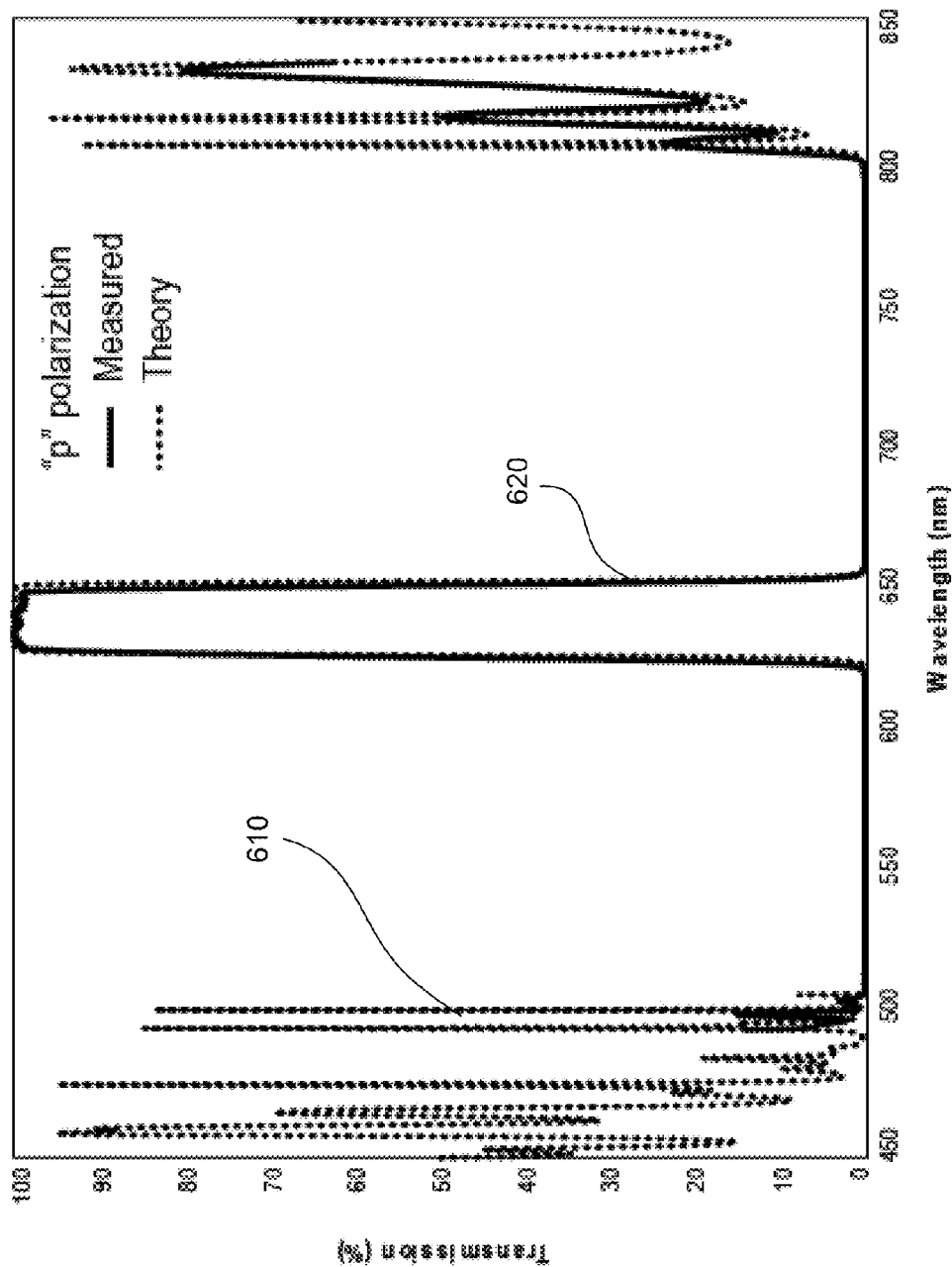
FIG. 6 depicts both the calculated and measured p-polarization transmission percentage of a 633 nm Polarization Bandpass Filter consistent with an embodiment of the present disclosure and consistent with the structure identified in Table 1.

FIG. 6 depicts both the calculated (dotted curve 610) and measured (curve 620) p-polarization transmission percentage of a 633 nm Polarization Bandpass Filter consistent with an embodiment of the present disclosure and consistent with the structure identified in Table 1.

Figure 7:
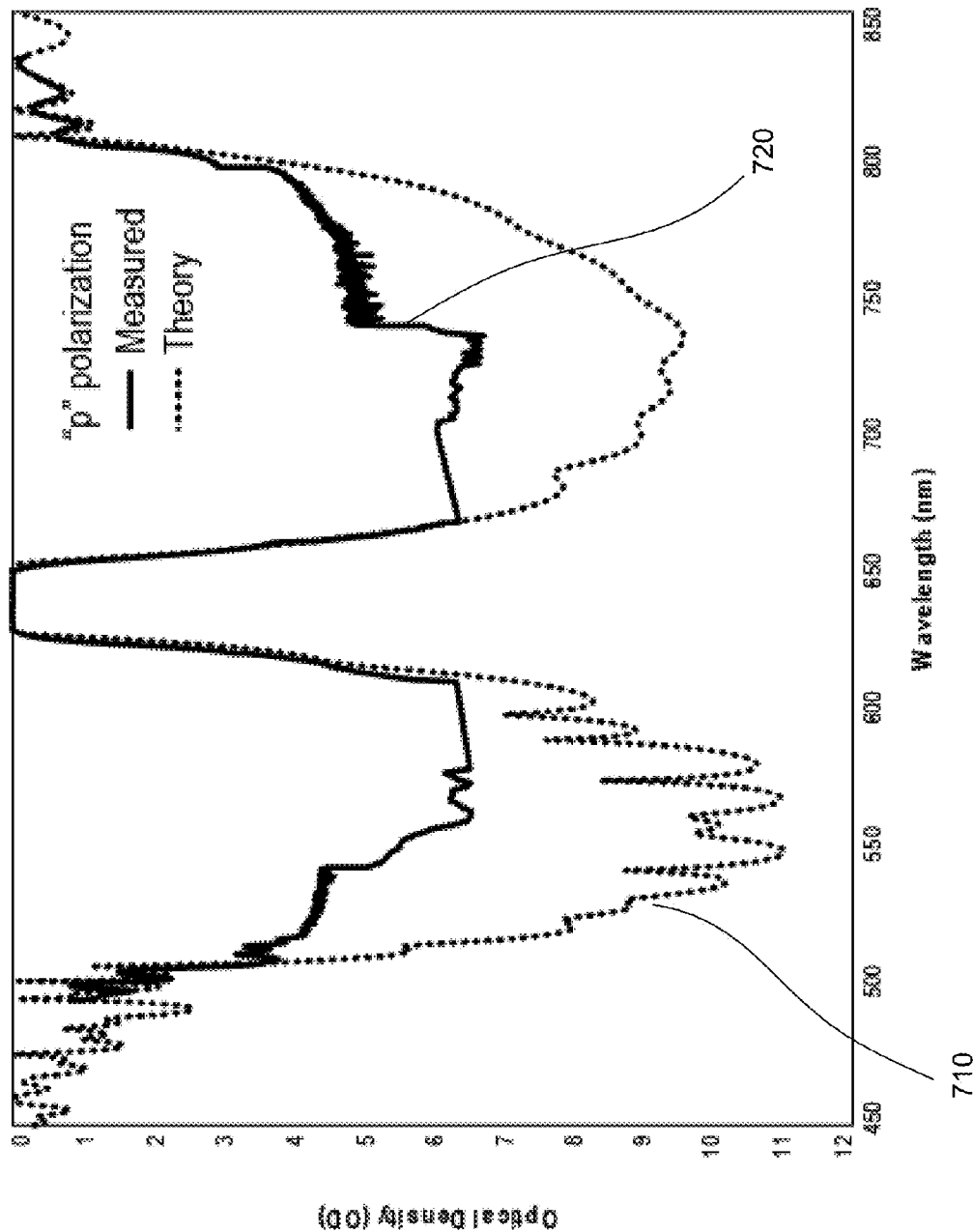
FIG. 7 depicts both the calculated and measured p-polarization Optical Density (OD) of a 633 nm Polarization Bandpass Filter consistent with an embodiment of the present disclosure and consistent with the structure identified in Table 1.

FIG. 7 depicts both the calculated (dotted curve 710) and measured (curve 720) p-polarization Optical Density (OD) of a 633 nm Polarization Bandpass Filter consistent with an embodiment of the present disclosure and consistent with the structure identified in Table 1. The measurement noise floor in FIG. 7 is different at different wavelengths. In general it is limited to about OD 4 (−40 dB), although it is lower at some wavelengths, particularly those further away from wavelengths of higher transmission (for either polarization).

Figure 8:
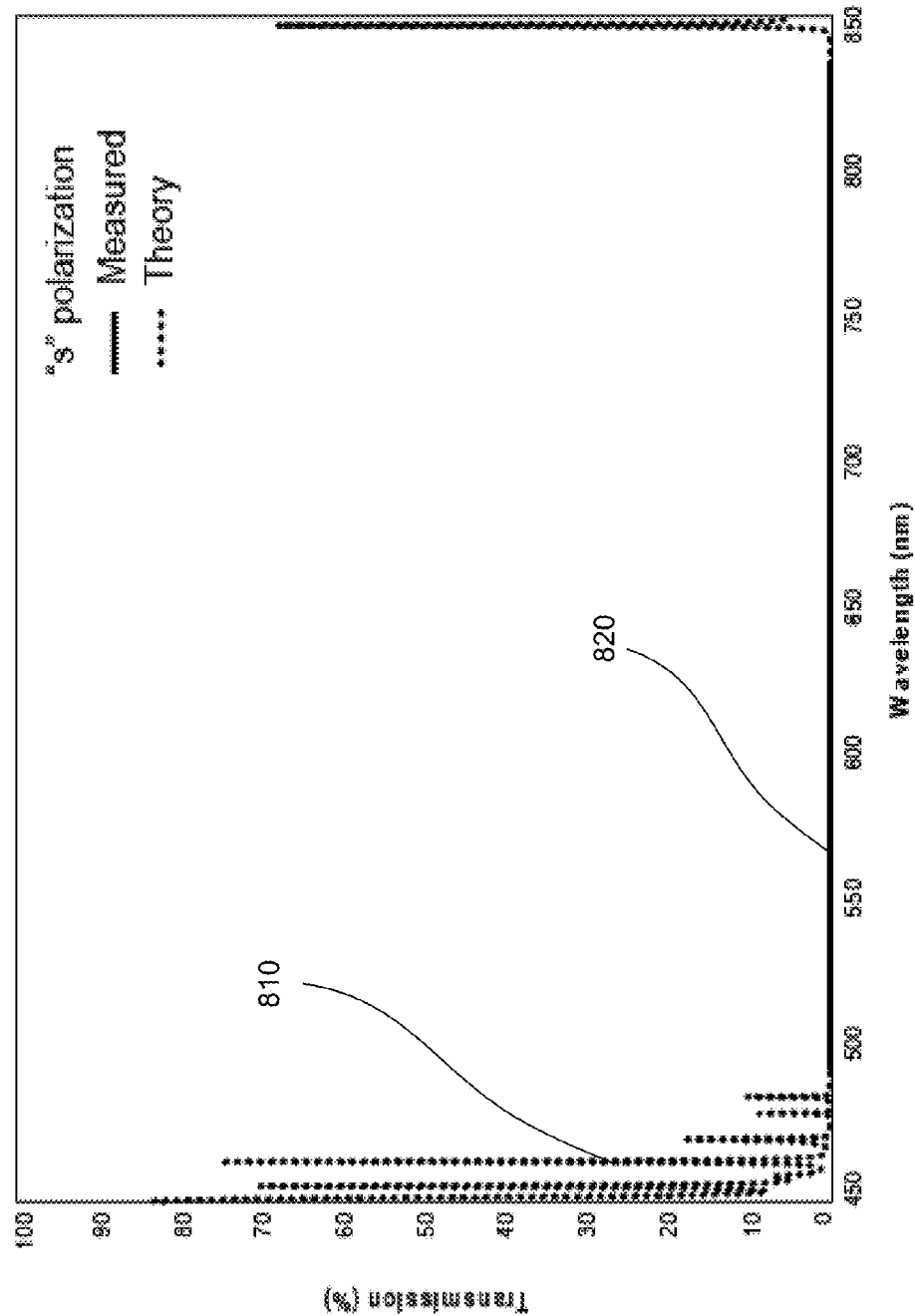
FIG. 8 depicts both the calculated and measured s-polarization transmission percentage of a 633 nm Polarization Bandpass Filter consistent with an embodiment of the present disclosure and consistent with the structure identified in Table 1.

FIG. 8 depicts both the calculated (dotted curve 810) and measured (curve 820) s-polarization transmission percentage of a 633 nm Polarization Bandpass Filter consistent with an embodiment of the present disclosure and consistent with the structure identified in Table 1. Note that the measured data ranges from only about 500 to 830 nm, and therefore is not distinguishable from the calculated data on this linear-scale plot.

Figure 9:
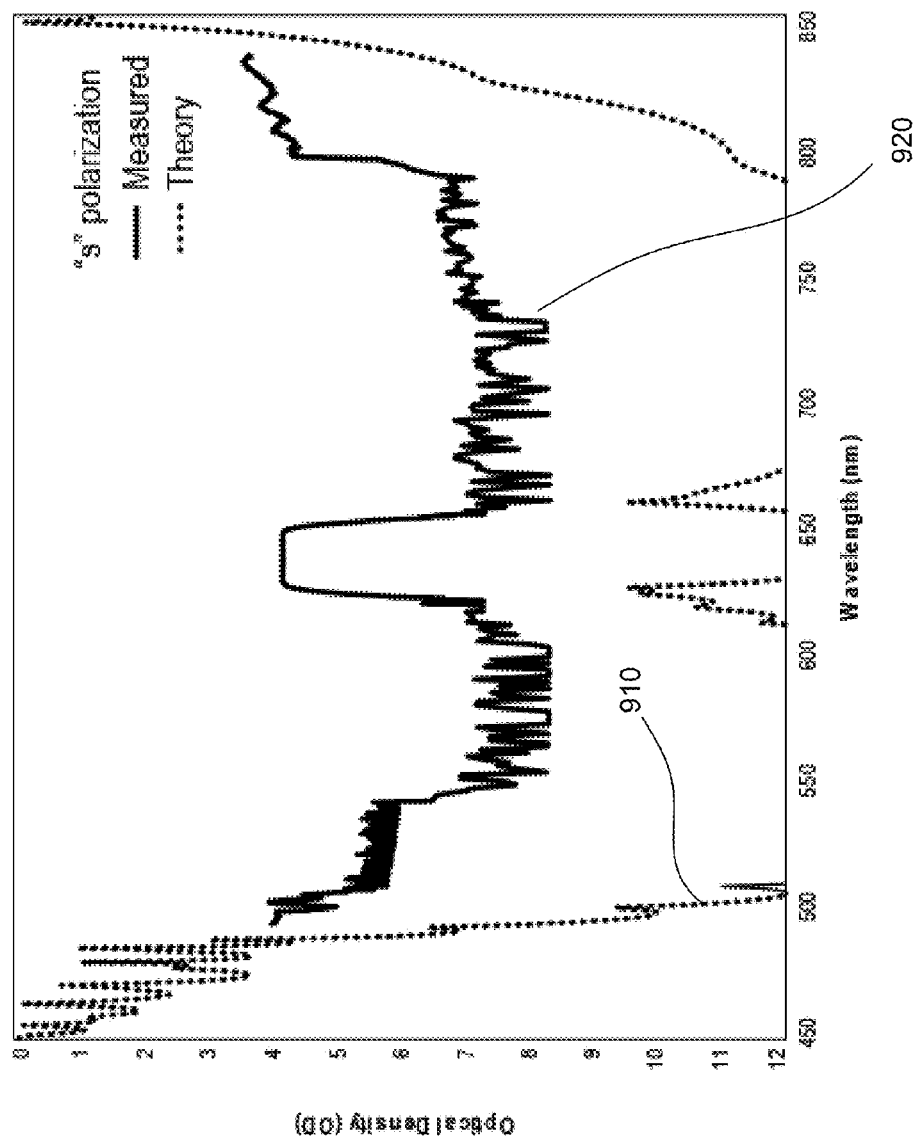
FIG. 9 depicts both the calculated and measured s-polarization Optical Density (OD) of a 633 nm Polarization Bandpass Filter consistent with an embodiment of the present disclosure and consistent with the structure identified in Table 1.

FIG. 9 depicts both the calculated (dotted curve 910) and measured (curve 920) s-polarization Optical Density (OD) of a 633 nm Polarization Bandpass Filter consistent with an embodiment of the present disclosure and consistent with the structure identified in Table 1. As with FIG. 7, the measurement noise floor in FIG. 9 is limited to about OD 4 (−40 dB)), particularly within the filter passband region. Thus the apparent passband at approximately 630 nm with a peak value of approximately OD 4 is an artifact of the measurement system, and is not representative of the actual value of transmission of s-polarized light near these wavelengths.

Further to the discussion above regarding the interpretation of the measured spectra shown in FIGS. 6-9, a more precise measurement of the contrast ratio at a single wavelength within the passband has been made. The beam from a 30 mW 632.8 nm HeNe laser was directed through two "clean-up" filters to eliminate any noise away from the laser wavelength (Semrock LL01-633 and FF01-633/22 filters). The beam was then passed through a one of the polarizing bandpass filters with the laser polarization axis approximately aligned with the p-polarization axis of the filter to achieve maximum transmission, and then through a neutral density filter with an OD of 1. The resulting beam was detected by a standard Si photodiode. The output voltage, after a transimpedance amplifier with the gain set to $10^5$, was measured to be 7.70 V. Next, a second polarizing bandpass filter was placed after the first, the ND filter was removed, and the gain on the amplifier was increased to $10^7$. The second filter was rotated about the laser beam (optical) axis to minimize the signal at the detector in order cross the polarization axes of the two filters. The output voltage was then measured to be 3.07 mV. The ratio of the unattenuated laser beam intensity to the attenuated intensity was thus $(7.70/3.07\times10^{-3})\times10^3=2,510,000$, where the factor $10^3$ arises because of the removal of the ND filter ($10^1$) and the increase in gain of $10^7/10^5=10^2$. Thus, the contrast ratio is at least 2,510,000:1, or OD 6.4. In fact it is believed to be appreciably higher than this value, which represents the noise-floor limit of this measurement system.

While the noise floor of the measurement system is insufficient to measure accurately the attenuation of light greater than a blocking level of about optical density (OD) 4 in FIGS. 7 and 9, the measured results are consistent with the theoretical prediction that the contrast ratio of the embodiment of Table 1 is greater than 1,000,000:1.

Table 2 below depicts the material, sequence of layers, and layer thickness of a thin-film design of an exemplary 532 nm polarization bandpass filter consistent with the present disclosure. The design for the polarizing bandpass filter has a total coating thickness of 14.369 um and a total layer count of 180. The design for the extended blocking has a total coating thickness of 14.382 um and a total layer count of 100.

TABLE 2

| Polarizing Bandpass Filter | | | Extended Blocking | | |
|---|---|---|---|---|---|
| Layer | Material | Thickness (nm) | Layer | Material | Thickness (nm) |
| 1 | Nb₂O₅ | 45.517007 | 1 | Nb₂O₅ | 127.620061 |
| 2 | SiO₂ | 76.497209 | 2 | SiO₂ | 245.676701 |
| 3 | Nb₂O₅ | 35.246569 | 3 | Nb₂O₅ | 113.011088 |
| 4 | SiO₂ | 80.870653 | 4 | SiO₂ | 221.244963 |
| 5 | Nb₂O₅ | 47.444038 | 5 | Nb₂O₅ | 138.961562 |
| 6 | SiO₂ | 95.149124 | 6 | SiO₂ | 237.879919 |
| 7 | Nb₂O₅ | 47.488064 | 7 | Nb₂O₅ | 129.562555 |
| 8 | SiO₂ | 92.190326 | 8 | SiO₂ | 222.787409 |
| 9 | Nb₂O₅ | 48.177733 | 9 | Nb₂O₅ | 135.207074 |
| 10 | SiO₂ | 86.842561 | 10 | SiO₂ | 215.626118 |
| 11 | Nb₂O₅ | 48.418622 | 11 | Nb₂O₅ | 139.159423 |
| 12 | SiO₂ | 82.330305 | 12 | SiO₂ | 216.113506 |
| 13 | Nb₂O₅ | 47.997723 | 13 | Nb₂O₅ | 135.483154 |
| 14 | SiO₂ | 84.015724 | 14 | SiO₂ | 212.349376 |
| 15 | Nb₂O₅ | 46.075392 | 15 | Nb₂O₅ | 148.216423 |
| 16 | SiO₂ | 88.613824 | 16 | SiO₂ | 214.953982 |
| 17 | Nb₂O₅ | 52.552005 | 17 | Nb₂O₅ | 132.826807 |
| 18 | SiO₂ | 91.850761 | 18 | SiO₂ | 217.493559 |
| 19 | Nb₂O₅ | 52.750536 | 19 | Nb₂O₅ | 130.989100 |
| 20 | SiO₂ | 91.063983 | 20 | SiO₂ | 217.301824 |
| 21 | Nb₂O₅ | 46.873211 | 21 | Nb₂O₅ | 140.022924 |
| 22 | SiO₂ | 88.206144 | 22 | SiO₂ | 222.256337 |
| 23 | Nb₂O₅ | 46.623818 | 23 | Nb₂O₅ | 110.913500 |
| 24 | SiO₂ | 84.089545 | 24 | SiO₂ | 222.196761 |
| 25 | Nb₂O₅ | 47.418478 | 25 | Nb₂O₅ | 122.895058 |
| 26 | SiO₂ | 83.010887 | 26 | SiO₂ | 182.737041 |
| 27 | Nb₂O₅ | 52.421141 | 27 | Nb₂O₅ | 136.192334 |
| 28 | SiO₂ | 86.692413 | 28 | SiO₂ | 233.981119 |
| 29 | Nb₂O₅ | 54.379124 | 29 | Nb₂O₅ | 126.498452 |
| 30 | SiO₂ | 90.713816 | 30 | SiO₂ | 204.653354 |
| 31 | Nb₂O₅ | 51.622008 | 31 | Nb₂O₅ | 135.221433 |
| 32 | SiO₂ | 92.557823 | 32 | SiO₂ | 206.407022 |
| 33 | Nb₂O₅ | 45.132714 | 33 | Nb₂O₅ | 115.859735 |
| 34 | SiO₂ | 87.025291 | 34 | SiO₂ | 230.581090 |
| 35 | Nb₂O₅ | 46.081098 | 35 | Nb₂O₅ | 117.600326 |
| 36 | SiO₂ | 84.501341 | 36 | SiO₂ | 205.983660 |
| 37 | Nb₂O₅ | 50.276398 | 37 | Nb₂O₅ | 141.546161 |
| 38 | SiO₂ | 84.090050 | 38 | SiO₂ | 230.652288 |
| 39 | Nb₂O₅ | 54.575001 | 39 | Nb₂O₅ | 118.350672 |
| 40 | SiO₂ | 82.330892 | 40 | SiO₂ | 228.600987 |
| 41 | Nb₂O₅ | 55.896536 | 41 | Nb₂O₅ | 123.708933 |
| 42 | SiO₂ | 83.939394 | 42 | SiO₂ | 178.811917 |
| 43 | Nb₂O₅ | 52.492803 | 43 | Nb₂O₅ | 118.283157 |
| 44 | SiO₂ | 86.209621 | 44 | SiO₂ | 190.750734 |
| 45 | Nb₂O₅ | 48.570611 | 45 | Nb₂O₅ | 112.363206 |
| 46 | SiO₂ | 88.058789 | 46 | SiO₂ | 165.555652 |
| 47 | Nb₂O₅ | 47.210881 | 47 | Nb₂O₅ | 111.857736 |
| 48 | SiO₂ | 87.257202 | 48 | SiO₂ | 201.048157 |
| 49 | Nb₂O₅ | 49.225311 | 49 | Nb₂O₅ | 107.523225 |
| 50 | SiO₂ | 84.648390 | 50 | SiO₂ | 186.805699 |
| 51 | Nb₂O₅ | 52.363218 | 51 | Nb₂O₅ | 121.987324 |
| 52 | SiO₂ | 80.794510 | 52 | SiO₂ | 180.321392 |
| 53 | Nb₂O₅ | 56.236364 | 53 | Nb₂O₅ | 113.854714 |
| 54 | SiO₂ | 78.232594 | 54 | SiO₂ | 186.340605 |
| 55 | Nb₂O₅ | 57.902087 | 55 | Nb₂O₅ | 105.534075 |
| 56 | SiO₂ | 79.174775 | 56 | SiO₂ | 165.796870 |
| 57 | Nb₂O₅ | 55.102816 | 57 | Nb₂O₅ | 114.031310 |
| 58 | SiO₂ | 82.788632 | 58 | SiO₂ | 184.355737 |
| 59 | Nb₂O₅ | 49.611691 | 59 | Nb₂O₅ | 97.351208 |
| 60 | SiO₂ | 86.717248 | 60 | SiO₂ | 159.150405 |
| 61 | Nb₂O₅ | 45.931399 | 61 | Nb₂O₅ | 94.120768 |
| 62 | SiO₂ | 88.838206 | 62 | SiO₂ | 185.274946 |
| 63 | Nb₂O₅ | 46.984899 | 63 | Nb₂O₅ | 103.044863 |
| 64 | SiO₂ | 89.127167 | 64 | SiO₂ | 161.070097 |
| 65 | Nb₂O₅ | 51.335178 | 65 | Nb₂O₅ | 110.134530 |
| 66 | SiO₂ | 86.852511 | 66 | SiO₂ | 178.503328 |
| 67 | Nb₂O₅ | 55.760855 | 67 | Nb₂O₅ | 105.683945 |
| 68 | SiO₂ | 82.023160 | 68 | SiO₂ | 92.434142 |
| 69 | Nb₂O₅ | 56.138740 | 69 | Nb₂O₅ | 110.025307 |
| 70 | SiO₂ | 78.046585 | 70 | SiO₂ | 84.621624 |
| 71 | Nb₂O₅ | 54.260380 | 71 | Nb₂O₅ | 118.292110 |
| 72 | SiO₂ | 78.068458 | 72 | SiO₂ | 220.070560 |
| 73 | Nb₂O₅ | 50.208171 | 73 | Nb₂O₅ | 102.243249 |
| 74 | SiO₂ | 81.888826 | 74 | SiO₂ | 147.382546 |
| 75 | Nb₂O₅ | 48.488523 | 75 | Nb₂O₅ | 79.887915 |
| 76 | SiO₂ | 85.652353 | 76 | SiO₂ | 173.723465 |
| 77 | Nb₂O₅ | 50.322784 | 77 | Nb₂O₅ | 82.819916 |
| 78 | SiO₂ | 87.624614 | 78 | SiO₂ | 136.807258 |
| 79 | Nb₂O₅ | 55.435470 | 79 | Nb₂O₅ | 98.298746 |
| 80 | SiO₂ | 85.285377 | 80 | SiO₂ | 127.750476 |
| 81 | Nb₂O₅ | 57.459590 | 81 | Nb₂O₅ | 74.594761 |
| 82 | SiO₂ | 77.534958 | 82 | SiO₂ | 136.823902 |
| 83 | Nb₂O₅ | 57.387896 | 83 | Nb₂O₅ | 94.549683 |
| 84 | SiO₂ | 74.177464 | 84 | SiO₂ | 127.016818 |
| 85 | Nb₂O₅ | 51.486178 | 85 | Nb₂O₅ | 95.814915 |
| 86 | SiO₂ | 70.551633 | 86 | SiO₂ | 158.214426 |
| 87 | Nb₂O₅ | 46.522439 | 87 | Nb₂O₅ | 70.561785 |
| 88 | SiO₂ | 68.962169 | 88 | SiO₂ | 170.061455 |
| 89 | Nb₂O₅ | 56.083587 | 89 | Nb₂O₅ | 61.721530 |
| 90 | SiO₂ | 81.317827 | 90 | SiO₂ | 115.250711 |
| 91 | Nb₂O₅ | 76.847578 | 91 | Nb₂O₅ | 85.292596 |
| 92 | SiO₂ | 96.284372 | 92 | SiO₂ | 136.934598 |
| 93 | Nb₂O₅ | 77.696133 | 93 | Nb₂O₅ | 80.258324 |
| 94 | SiO₂ | 121.901395 | 94 | SiO₂ | 104.875444 |
| 95 | Nb₂O₅ | 69.290744 | 95 | Nb₂O₅ | 94.859929 |
| 96 | SiO₂ | 131.082679 | 96 | SiO₂ | 118.023369 |
| 97 | Nb₂O₅ | 64.230428 | 97 | Nb₂O₅ | 15.889228 |
| 98 | SiO₂ | 127.887643 | 98 | SiO₂ | 40.932894 |
| 99 | Nb₂O₅ | 61.656274 | 99 | Nb₂O₅ | 52.216434 |
| 100 | SiO₂ | 125.348733 | 100 | SiO₂ | 124.495443 |
| 101 | Nb₂O₅ | 62.539181 | | | |
| 102 | SiO₂ | 118.802007 | | | |
| 103 | Nb₂O₅ | 67.192927 | | | |
| 104 | SiO₂ | 115.192558 | | | |
| 105 | Nb₂O₅ | 70.745710 | | | |
| 106 | SiO₂ | 115.252739 | | | |
| 107 | Nb₂O₅ | 70.783244 | | | |
| 108 | SiO₂ | 118.794014 | | | |
| 109 | Nb₂O₅ | 67.288583 | | | |
| 110 | SiO₂ | 121.796117 | | | |
| 111 | Nb₂O₅ | 65.310838 | | | |
| 112 | SiO₂ | 119.865138 | | | |
| 113 | Nb₂O₅ | 66.926840 | | | |
| 114 | SiO₂ | 114.446735 | | | |
| 115 | Nb₂O₅ | 70.215057 | | | |
| 116 | SiO₂ | 109.615559 | | | |
| 117 | Nb₂O₅ | 74.263947 | | | |
| 118 | SiO₂ | 108.652702 | | | |
| 119 | Nb₂O₅ | 73.694911 | | | |
| 120 | SiO₂ | 112.826536 | | | |
| 121 | Nb₂O₅ | 69.982383 | | | |
| 122 | SiO₂ | 116.268381 | | | |
| 123 | Nb₂O₅ | 67.233507 | | | |
| 124 | SiO₂ | 118.360159 | | | |
| 125 | Nb₂O₅ | 66.920745 | | | |
| 126 | SiO₂ | 117.343641 | | | |
| 127 | Nb₂O₅ | 68.835408 | | | |
| 128 | SiO₂ | 111.834397 | | | |
| 129 | Nb₂O₅ | 73.537417 | | | |
| 130 | SiO₂ | 106.446264 | | | |
| 131 | Nb₂O₅ | 76.919693 | | | |
| 132 | SiO₂ | 109.747676 | | | |
| 133 | Nb₂O₅ | 70.616072 | | | |
| 134 | SiO₂ | 117.327515 | | | |
| 135 | Nb₂O₅ | 58.088006 | | | |
| 136 | SiO₂ | 118.645878 | | | |
| 137 | Nb₂O₅ | 79.545339 | | | |
| 138 | SiO₂ | 114.083793 | | | |
| 139 | Nb₂O₅ | 64.761010 | | | |
| 140 | SiO₂ | 108.468007 | | | |
| 141 | Nb₂O₅ | 70.848541 | | | |
| 142 | SiO₂ | 108.884220 | | | |
| 143 | Nb₂O₅ | 78.750872 | | | |
| 144 | SiO₂ | 109.301275 | | | |
| 145 | Nb₂O₅ | 75.510093 | | | |
| 146 | SiO₂ | 113.041103 | | | |
| 147 | Nb₂O₅ | 60.611943 | | | |
| 148 | SiO₂ | 117.606548 | | | |
| 149 | Nb₂O₅ | 62.743487 | | | |
| 150 | SiO₂ | 119.179805 | | | |
| 151 | Nb₂O₅ | 77.985917 | | | |
| 152 | SiO₂ | 112.635280 | | | |

TABLE 2-continued

| | Polarizing Bandpass Filter | | | Extended Blocking | |
|---|---|---|---|---|---|
| Layer | Material | Thickness (nm) | Layer | Material | Thickness (nm) |
| 153 | $Nb_2O_5$ | 73.903519 | | | |
| 154 | $SiO_2$ | 106.977138 | | | |
| 155 | $Nb_2O_5$ | 68.913057 | | | |
| 156 | $SiO_2$ | 107.890171 | | | |
| 157 | $Nb_2O_5$ | 73.766677 | | | |
| 158 | $SiO_2$ | 110.703528 | | | |
| 159 | $Nb_2O_5$ | 69.077871 | | | |
| 160 | $SiO_2$ | 117.279097 | | | |
| 161 | $Nb_2O_5$ | 71.021381 | | | |
| 162 | $SiO_2$ | 119.349301 | | | |
| 163 | $Nb_2O_5$ | 71.748821 | | | |
| 164 | $SiO_2$ | 110.691409 | | | |
| 165 | $Nb_2O_5$ | 72.251591 | | | |
| 166 | $SiO_2$ | 104.627478 | | | |
| 167 | $Nb_2O_5$ | 74.003889 | | | |
| 168 | $SiO_2$ | 109.431170 | | | |
| 169 | $Nb_2O_5$ | 71.624679 | | | |
| 170 | $SiO_2$ | 118.654920 | | | |
| 171 | $Nb_2O_5$ | 71.030166 | | | |
| 172 | $SiO_2$ | 127.327127 | | | |
| 173 | $Nb_2O_5$ | 67.425738 | | | |
| 174 | $SiO_2$ | 124.646495 | | | |
| 175 | $Nb_2O_5$ | 65.102421 | | | |
| 176 | $SiO_2$ | 101.322126 | | | |
| 177 | $Nb_2O_5$ | 95.564315 | | | |
| 178 | $SiO_2$ | 112.097613 | | | |
| 179 | $Nb_2O_5$ | 81.053508 | | | |
| 180 | $SiO_2$ | 71.248600 | | | |

Figure 11:
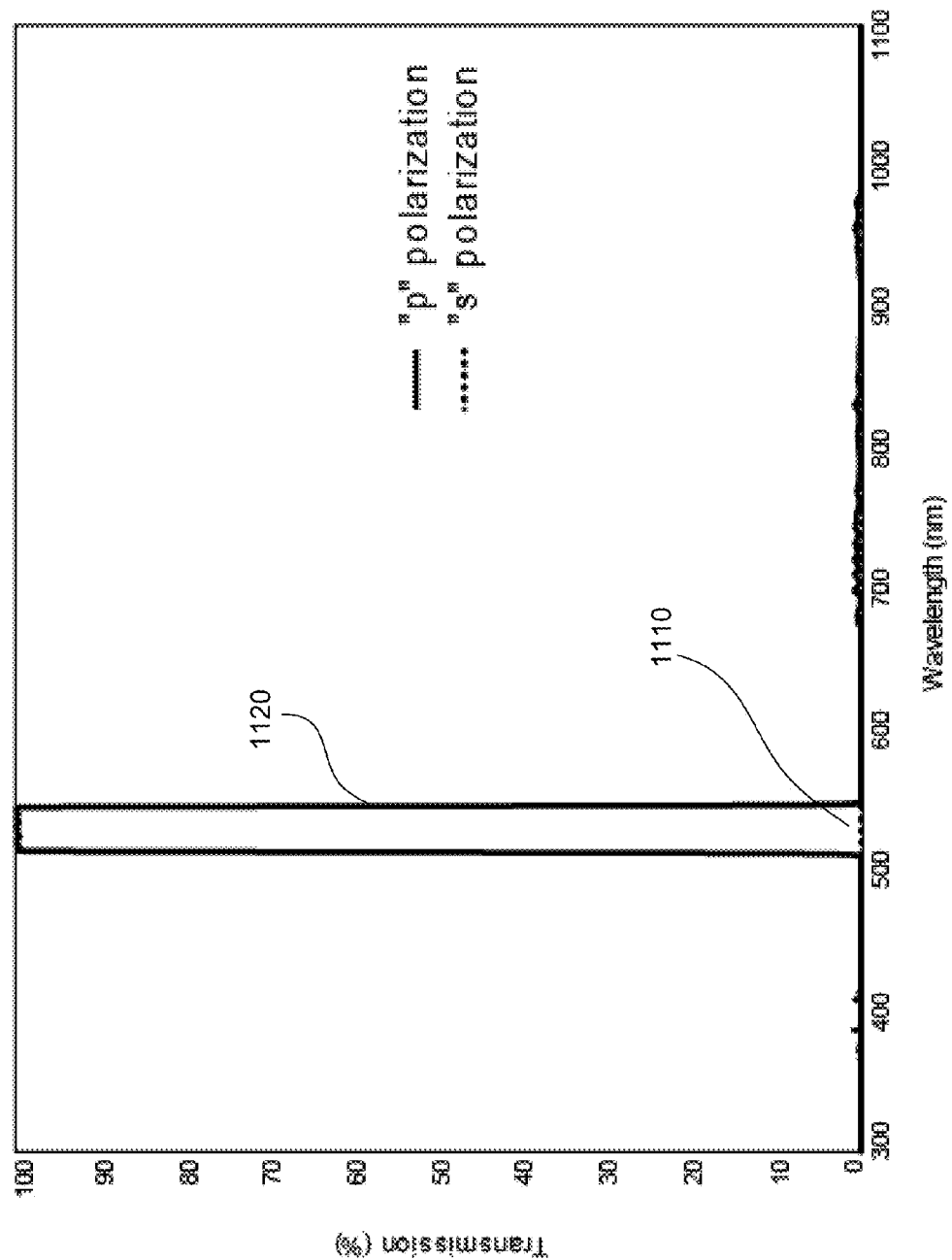
FIG. 11 depicts the calculated transmission percentage for both s-polarization and p-polarization of a 532 nm Polarization Bandpass Filter consistent with an embodiment of the present disclosure and consistent with the structure identified in Table 2.
Figure 12:
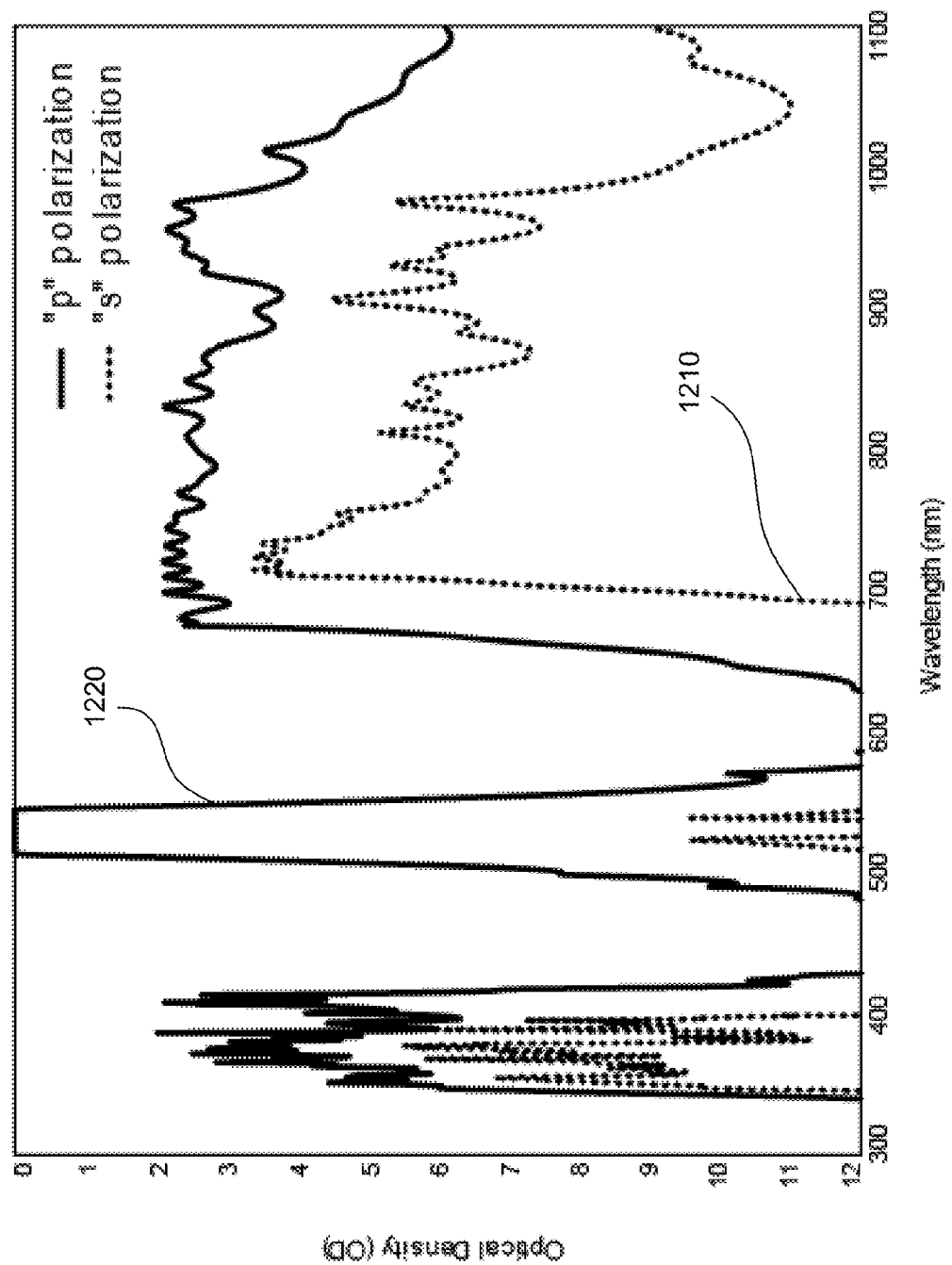
FIG. 12 depicts the calculated Optical Density (OD) for both s-polarization and p-polarization of a 532 nm Polarization Bandpass Filter consistent with an embodiment of the present disclosure and consistent with the structure identified in Table 2.

FIGS. 11 and 12 depict the theoretical design spectra for p- and s-polarized light associated with the exemplary 532 nm polarizing bandpass filter of Table 2. This exemplary filter may be used, for example, as a laser clean-up filter for a frequency doubled 532 nm Nd:YAG, in which both polarization and spectral clean-up functions are performed. FIG. 11 depicts the calculated transmission percentage for s-polarization (dotted curve 1110) and p-polarization (curve 1120) and FIG. 12 depicts the calculated OD of the structure of Table 2 for s-polarization (dotted curve 1210) and p-polarization (curve 1220). The example illustrates the use of the extended blocking on the second side of the substrate to further expand the blocking range of the polarizing bandpass filter to cover the entire range of sensitivity of a typical Si photodiode detector. The extended blocking also offers additional functionality by providing OD 5 blocking for p-polarization and OD 6 blocking for s-polarization over the fundamental wavelength of a frequency doubled 532 nm Nd:YAG laser at 1064 nm. Furthermore, the coatings on opposite sides of the substrate are configured to exhibit approximately the same coating stress in order to minimize substrate bending.

Table 3 below depicts the material, sequence of layers, and layer thickness of a thin-film design of an exemplary 1064 nm polarization bandpass filter consistent with the present disclosure. The design for the polarizing bandpass filter has a total coating thickness of 25.944 um and a total layer count of 158. The design for the extended blocking has a total coating thickness of 25.937 um and a total layer count of 214.

TABLE 3

| | Polarizing Bandpass Filter | | | Extended Blocking | |
|---|---|---|---|---|---|
| Layer | Material | Thickness (nm) | Layer | Material | Thickness (nm) |
| 1 | $Nb_2O_5$ | 76.269680 | 1 | $Nb_2O_5$ | 24.017568 |
| 2 | $SiO_2$ | 175.873885 | 2 | $SiO_2$ | 72.505701 |
| 3 | $Nb_2O_5$ | 81.855957 | 3 | $Nb_2O_5$ | 34.038790 |
| 4 | $SiO_2$ | 177.833901 | 4 | $SiO_2$ | 68.918568 |
| 5 | $Nb_2O_5$ | 97.588287 | 5 | $Nb_2O_5$ | 48.082415 |
| 6 | $SiO_2$ | 182.251856 | 6 | $SiO_2$ | 61.260696 |
| 7 | $Nb_2O_5$ | 100.291445 | 7 | $Nb_2O_5$ | 35.040893 |
| 8 | $SiO_2$ | 185.784944 | 8 | $SiO_2$ | 64.884759 |
| 9 | $Nb_2O_5$ | 101.393477 | 9 | $Nb_2O_5$ | 33.660408 |
| 10 | $SiO_2$ | 182.261530 | 10 | $SiO_2$ | 69.429266 |
| 11 | $Nb_2O_5$ | 104.143546 | 11 | $Nb_2O_5$ | 49.042511 |
| 12 | $SiO_2$ | 179.259236 | 12 | $SiO_2$ | 62.770267 |
| 13 | $Nb_2O_5$ | 111.304569 | 13 | $Nb_2O_5$ | 42.036900 |
| 14 | $SiO_2$ | 174.471870 | 14 | $SiO_2$ | 60.614197 |
| 15 | $Nb_2O_5$ | 110.491593 | 15 | $Nb_2O_5$ | 36.782341 |
| 16 | $SiO_2$ | 169.568408 | 16 | $SiO_2$ | 63.141080 |
| 17 | $Nb_2O_5$ | 100.628981 | 17 | $Nb_2O_5$ | 46.965337 |
| 18 | $SiO_2$ | 169.275661 | 18 | $SiO_2$ | 60.459907 |
| 19 | $Nb_2O_5$ | 113.023407 | 19 | $Nb_2O_5$ | 43.826132 |
| 20 | $SiO_2$ | 173.796847 | 20 | $SiO_2$ | 63.617501 |
| 21 | $Nb_2O_5$ | 120.712498 | 21 | $Nb_2O_5$ | 37.731486 |
| 22 | $SiO_2$ | 179.266481 | 22 | $SiO_2$ | 63.573651 |
| 23 | $Nb_2O_5$ | 110.794679 | 23 | $Nb_2O_5$ | 41.152106 |
| 24 | $SiO_2$ | 182.015345 | 24 | $SiO_2$ | 61.375091 |
| 25 | $Nb_2O_5$ | 95.620691 | 25 | $Nb_2O_5$ | 15.090968 |
| 26 | $SiO_2$ | 183.080081 | 26 | $SiO_2$ | 70.048312 |
| 27 | $Nb_2O_5$ | 99.652939 | 27 | $Nb_2O_5$ | 42.243729 |
| 28 | $SiO_2$ | 183.121005 | 28 | $SiO_2$ | 66.290824 |
| 29 | $Nb_2O_5$ | 111.420681 | 29 | $Nb_2O_5$ | 47.237748 |
| 30 | $SiO_2$ | 180.715424 | 30 | $SiO_2$ | 74.594613 |
| 31 | $Nb_2O_5$ | 116.457865 | 31 | $Nb_2O_5$ | 47.781563 |
| 32 | $SiO_2$ | 175.889789 | 32 | $SiO_2$ | 70.165998 |
| 33 | $Nb_2O_5$ | 100.927838 | 33 | $Nb_2O_5$ | 35.545157 |
| 34 | $SiO_2$ | 172.868995 | 34 | $SiO_2$ | 69.796697 |
| 35 | $Nb_2O_5$ | 112.922033 | 35 | $Nb_2O_5$ | 51.218382 |
| 36 | $SiO_2$ | 171.907336 | 36 | $SiO_2$ | 73.574028 |
| 37 | $Nb_2O_5$ | 111.144934 | 37 | $Nb_2O_5$ | 56.931993 |
| 38 | $SiO_2$ | 174.881267 | 38 | $SiO_2$ | 81.111366 |
| 39 | $Nb_2O_5$ | 109.407350 | 39 | $Nb_2O_5$ | 50.608482 |
| 40 | $SiO_2$ | 178.835664 | 40 | $SiO_2$ | 86.951447 |
| 41 | $Nb_2O_5$ | 110.996851 | 41 | $Nb_2O_5$ | 55.272387 |
| 42 | $SiO_2$ | 183.107314 | 42 | $SiO_2$ | 83.604089 |
| 43 | $Nb_2O_5$ | 106.058571 | 43 | $Nb_2O_5$ | 46.872214 |
| 44 | $SiO_2$ | 184.401057 | 44 | $SiO_2$ | 76.894926 |
| 45 | $Nb_2O_5$ | 102.002680 | 45 | $Nb_2O_5$ | 25.040071 |
| 46 | $SiO_2$ | 183.676346 | 46 | $SiO_2$ | 71.601668 |
| 47 | $Nb_2O_5$ | 102.109305 | 47 | $Nb_2O_5$ | 54.544201 |
| 48 | $SiO_2$ | 179.389432 | 48 | $SiO_2$ | 89.350081 |
| 49 | $Nb_2O_5$ | 108.012853 | 49 | $Nb_2O_5$ | 53.453774 |
| 50 | $SiO_2$ | 171.502266 | 50 | $SiO_2$ | 94.841758 |
| 51 | $Nb_2O_5$ | 114.845235 | 51 | $Nb_2O_5$ | 43.424327 |
| 52 | $SiO_2$ | 169.066522 | 52 | $SiO_2$ | 89.709506 |
| 53 | $Nb_2O_5$ | 119.728433 | 53 | $Nb_2O_5$ | 55.995009 |
| 54 | $SiO_2$ | 169.172212 | 54 | $SiO_2$ | 93.250233 |
| 55 | $Nb_2O_5$ | 117.016762 | 55 | $Nb_2O_5$ | 59.296262 |
| 56 | $SiO_2$ | 170.534551 | 56 | $SiO_2$ | 98.915777 |
| 57 | $Nb_2O_5$ | 110.244732 | 57 | $Nb_2O_5$ | 53.536737 |
| 58 | $SiO_2$ | 174.758914 | 58 | $SiO_2$ | 93.090994 |
| 59 | $Nb_2O_5$ | 104.190735 | 59 | $Nb_2O_5$ | 64.308972 |
| 60 | $SiO_2$ | 180.880028 | 60 | $SiO_2$ | 91.709614 |
| 61 | $Nb_2O_5$ | 100.859964 | 61 | $Nb_2O_5$ | 65.940442 |
| 62 | $SiO_2$ | 185.352085 | 62 | $SiO_2$ | 89.607012 |
| 63 | $Nb_2O_5$ | 101.585471 | 63 | $Nb_2O_5$ | 54.125273 |
| 64 | $SiO_2$ | 184.663108 | 64 | $SiO_2$ | 94.091782 |
| 65 | $Nb_2O_5$ | 105.418473 | 65 | $Nb_2O_5$ | 57.506857 |
| 66 | $SiO_2$ | 181.349453 | 66 | $SiO_2$ | 96.091395 |
| 67 | $Nb_2O_5$ | 112.591504 | 67 | $Nb_2O_5$ | 65.489312 |
| 68 | $SiO_2$ | 175.972741 | 68 | $SiO_2$ | 96.118785 |
| 69 | $Nb_2O_5$ | 119.697424 | 69 | $Nb_2O_5$ | 51.265493 |
| 70 | $SiO_2$ | 167.348353 | 70 | $SiO_2$ | 88.735083 |
| 71 | $Nb_2O_5$ | 120.346495 | 71 | $Nb_2O_5$ | 56.843423 |
| 72 | $SiO_2$ | 158.028639 | 72 | $SiO_2$ | 94.685492 |
| 73 | $Nb_2O_5$ | 112.908639 | 73 | $Nb_2O_5$ | 66.495671 |
| 74 | $SiO_2$ | 154.524230 | 74 | $SiO_2$ | 93.247781 |
| 75 | $Nb_2O_5$ | 103.079890 | 75 | $Nb_2O_5$ | 54.678349 |
| 76 | $SiO_2$ | 158.307329 | 76 | $SiO_2$ | 95.080386 |
| 77 | $Nb_2O_5$ | 104.555945 | 77 | $Nb_2O_5$ | 62.407787 |
| 78 | $SiO_2$ | 149.894095 | 78 | $SiO_2$ | 99.304635 |
| 79 | $Nb_2O_5$ | 133.744076 | 79 | $Nb_2O_5$ | 59.647837 |

TABLE 3-continued

| Polarizing Bandpass Filter | | | Extended Blocking | | |
|---|---|---|---|---|---|
| Layer | Material | Thickness (nm) | Layer | Material | Thickness (nm) |
| 80 | SiO$_2$ | 157.238880 | 80 | SiO$_2$ | 109.564913 |
| 81 | Nb$_2$O$_5$ | 157.307257 | 81 | Nb$_2$O$_5$ | 62.376800 |
| 82 | SiO$_2$ | 222.421365 | 82 | SiO$_2$ | 100.732925 |
| 83 | Nb$_2$O$_5$ | 164.978387 | 83 | Nb$_2$O$_5$ | 68.651293 |
| 84 | SiO$_2$ | 243.442190 | 84 | SiO$_2$ | 104.238212 |
| 85 | Nb$_2$O$_5$ | 146.108167 | 85 | Nb$_2$O$_5$ | 51.501480 |
| 86 | SiO$_2$ | 257.982159 | 86 | SiO$_2$ | 106.578758 |
| 87 | Nb$_2$O$_5$ | 128.513473 | 87 | Nb$_2$O$_5$ | 60.370934 |
| 88 | SiO$_2$ | 258.795726 | 88 | SiO$_2$ | 99.078531 |
| 89 | Nb$_2$O$_5$ | 125.796396 | 89 | Nb$_2$O$_5$ | 60.395578 |
| 90 | SiO$_2$ | 251.547528 | 90 | SiO$_2$ | 107.873882 |
| 91 | Nb$_2$O$_5$ | 130.824772 | 91 | Nb$_2$O$_5$ | 58.365952 |
| 92 | SiO$_2$ | 241.243358 | 92 | SiO$_2$ | 103.836848 |
| 93 | Nb$_2$O$_5$ | 139.284763 | 93 | Nb$_2$O$_5$ | 59.074118 |
| 94 | SiO$_2$ | 231.725020 | 94 | SiO$_2$ | 104.419870 |
| 95 | Nb$_2$O$_5$ | 146.396928 | 95 | Nb$_2$O$_5$ | 61.098665 |
| 96 | SiO$_2$ | 226.514970 | 96 | SiO$_2$ | 101.356843 |
| 97 | Nb$_2$O$_5$ | 150.465432 | 97 | Nb$_2$O$_5$ | 65.338759 |
| 98 | SiO$_2$ | 226.562033 | 98 | SiO$_2$ | 101.783813 |
| 99 | Nb$_2$O$_5$ | 148.377656 | 99 | Nb$_2$O$_5$ | 64.561088 |
| 100 | SiO$_2$ | 230.672338 | 100 | SiO$_2$ | 109.847541 |
| 101 | Nb$_2$O$_5$ | 142.433993 | 101 | Nb$_2$O$_5$ | 63.376546 |
| 102 | SiO$_2$ | 235.783824 | 102 | SiO$_2$ | 104.451557 |
| 103 | Nb$_2$O$_5$ | 137.750861 | 103 | Nb$_2$O$_5$ | 67.732729 |
| 104 | SiO$_2$ | 239.522217 | 104 | SiO$_2$ | 111.209044 |
| 105 | Nb$_2$O$_5$ | 135.363863 | 105 | Nb$_2$O$_5$ | 63.884836 |
| 106 | SiO$_2$ | 238.499326 | 106 | SiO$_2$ | 118.263053 |
| 107 | Nb$_2$O$_5$ | 140.704385 | 107 | Nb$_2$O$_5$ | 64.403140 |
| 108 | SiO$_2$ | 232.901602 | 108 | SiO$_2$ | 107.722446 |
| 109 | Nb$_2$O$_5$ | 147.066765 | 109 | Nb$_2$O$_5$ | 66.921505 |
| 110 | SiO$_2$ | 224.559510 | 110 | SiO$_2$ | 114.222833 |
| 111 | Nb$_2$O$_5$ | 152.917026 | 111 | Nb$_2$O$_5$ | 81.043909 |
| 112 | SiO$_2$ | 219.188397 | 112 | SiO$_2$ | 119.079233 |
| 113 | Nb$_2$O$_5$ | 153.316877 | 113 | Nb$_2$O$_5$ | 75.048831 |
| 114 | SiO$_2$ | 219.076154 | 114 | SiO$_2$ | 127.631515 |
| 115 | Nb$_2$O$_5$ | 146.824224 | 115 | Nb$_2$O$_5$ | 79.697160 |
| 116 | SiO$_2$ | 221.821296 | 116 | SiO$_2$ | 129.232124 |
| 117 | Nb$_2$O$_5$ | 142.055954 | 117 | Nb$_2$O$_5$ | 75.689855 |
| 118 | SiO$_2$ | 226.394113 | 118 | SiO$_2$ | 124.377047 |
| 119 | Nb$_2$O$_5$ | 141.260286 | 119 | Nb$_2$O$_5$ | 73.324674 |
| 120 | SiO$_2$ | 229.844594 | 120 | SiO$_2$ | 129.389361 |
| 121 | Nb$_2$O$_5$ | 164.281663 | 121 | Nb$_2$O$_5$ | 72.158316 |
| 122 | SiO$_2$ | 231.310045 | 122 | SiO$_2$ | 122.156334 |
| 123 | Nb$_2$O$_5$ | 130.264386 | 123 | Nb$_2$O$_5$ | 72.711426 |
| 124 | SiO$_2$ | 228.799850 | 124 | SiO$_2$ | 146.819015 |
| 125 | Nb$_2$O$_5$ | 153.232261 | 125 | Nb$_2$O$_5$ | 77.931869 |
| 126 | SiO$_2$ | 224.589667 | 126 | SiO$_2$ | 137.556689 |
| 127 | Nb$_2$O$_5$ | 136.665820 | 127 | Nb$_2$O$_5$ | 70.401333 |
| 128 | SiO$_2$ | 221.051085 | 128 | SiO$_2$ | 141.079211 |
| 129 | Nb$_2$O$_5$ | 147.060919 | 129 | Nb$_2$O$_5$ | 72.030535 |
| 130 | SiO$_2$ | 219.903957 | 130 | SiO$_2$ | 134.882298 |
| 131 | Nb$_2$O$_5$ | 176.451217 | 131 | Nb$_2$O$_5$ | 80.575108 |
| 132 | SiO$_2$ | 223.193355 | 132 | SiO$_2$ | 132.855800 |
| 133 | Nb$_2$O$_5$ | 130.286602 | 133 | Nb$_2$O$_5$ | 86.349552 |
| 134 | SiO$_2$ | 227.797986 | 134 | SiO$_2$ | 162.604521 |
| 135 | Nb$_2$O$_5$ | 126.377815 | 135 | Nb$_2$O$_5$ | 83.706143 |
| 136 | SiO$_2$ | 231.344348 | 136 | SiO$_2$ | 150.860663 |
| 137 | Nb$_2$O$_5$ | 161.185802 | 137 | Nb$_2$O$_5$ | 88.308783 |
| 138 | SiO$_2$ | 230.196868 | 138 | SiO$_2$ | 151.580754 |
| 139 | Nb$_2$O$_5$ | 160.891759 | 139 | Nb$_2$O$_5$ | 86.137495 |
| 140 | SiO$_2$ | 222.354947 | 140 | SiO$_2$ | 145.467726 |
| 141 | Nb$_2$O$_5$ | 127.934270 | 141 | Nb$_2$O$_5$ | 93.823618 |
| 142 | SiO$_2$ | 220.428832 | 142 | SiO$_2$ | 145.692395 |
| 143 | Nb$_2$O$_5$ | 151.698692 | 143 | Nb$_2$O$_5$ | 88.638113 |
| 144 | SiO$_2$ | 223.641545 | 144 | SiO$_2$ | 166.522326 |
| 145 | Nb$_2$O$_5$ | 159.459213 | 145 | Nb$_2$O$_5$ | 82.758192 |
| 146 | SiO$_2$ | 230.335517 | 146 | SiO$_2$ | 162.437548 |
| 147 | Nb$_2$O$_5$ | 146.210897 | 147 | Nb$_2$O$_5$ | 102.722876 |
| 148 | SiO$_2$ | 242.848429 | 148 | SiO$_2$ | 158.591803 |
| 149 | Nb$_2$O$_5$ | 133.369419 | 149 | Nb$_2$O$_5$ | 89.013031 |
| 150 | SiO$_2$ | 255.250171 | 150 | SiO$_2$ | 172.028574 |
| 151 | Nb$_2$O$_5$ | 128.530552 | 151 | Nb$_2$O$_5$ | 93.019817 |
| 152 | SiO$_2$ | 255.413595 | 152 | SiO$_2$ | 162.373266 |
| 153 | Nb$_2$O$_5$ | 154.028764 | 153 | Nb$_2$O$_5$ | 100.767844 |
| 154 | SiO$_2$ | 236.989414 | 154 | SiO$_2$ | 168.402745 |
| 155 | Nb$_2$O$_5$ | 172.327509 | 155 | Nb$_2$O$_5$ | 90.165787 |
| 156 | SiO$_2$ | 209.578318 | 156 | SiO$_2$ | 165.029500 |
| 157 | Nb$_2$O$_5$ | 188.157719 | 157 | Nb$_2$O$_5$ | 98.282752 |
| 158 | SiO$_2$ | 116.530002 | 158 | SiO$_2$ | 161.905593 |
| | | | 159 | Nb$_2$O$_5$ | 93.909673 |
| | | | 160 | SiO$_2$ | 165.503978 |
| | | | 161 | Nb$_2$O$_5$ | 97.410323 |
| | | | 162 | SiO$_2$ | 163.508848 |
| | | | 163 | Nb$_2$O$_5$ | 81.461916 |
| | | | 164 | SiO$_2$ | 160.847345 |
| | | | 165 | Nb$_2$O$_5$ | 90.821141 |
| | | | 166 | SiO$_2$ | 167.418231 |
| | | | 167 | Nb$_2$O$_5$ | 254.442506 |
| | | | 168 | SiO$_2$ | 253.216268 |
| | | | 169 | Nb$_2$O$_5$ | 177.126935 |
| | | | 170 | SiO$_2$ | 196.325506 |
| | | | 171 | Nb$_2$O$_5$ | 200.553685 |
| | | | 172 | SiO2 | 253.922016 |
| | | | 173 | Nb$_2$O$_5$ | 146.371458 |
| | | | 174 | SiO$_2$ | 281.770599 |
| | | | 175 | Nb$_2$O$_5$ | 168.294617 |
| | | | 176 | SiO$_2$ | 269.510376 |
| | | | 177 | Nb$_2$O$_5$ | 188.346604 |
| | | | 178 | SiO$_2$ | 271.106979 |
| | | | 179 | Nb$_2$O$_5$ | 182.796162 |
| | | | 180 | SiO$_2$ | 274.135359 |
| | | | 181 | Nb$_2$O$_5$ | 172.174666 |
| | | | 182 | SiO$_2$ | 279.869089 |
| | | | 183 | Nb$_2$O$_5$ | 152.030745 |
| | | | 184 | SiO$_2$ | 276.406444 |
| | | | 185 | Nb$_2$O$_5$ | 177.759023 |
| | | | 186 | SiO$_2$ | 269.816222 |
| | | | 187 | Nb$_2$O$_5$ | 180.876591 |
| | | | 188 | SiO$_2$ | 288.212703 |
| | | | 189 | Nb$_2$O$_5$ | 177.589573 |
| | | | 190 | SiO$_2$ | 308.111767 |
| | | | 191 | Nb$_2$O$_5$ | 175.497904 |
| | | | 192 | SiO$_2$ | 370.663757 |
| | | | 193 | Nb$_2$O$_5$ | 231.124138 |
| | | | 194 | SiO$_2$ | 333.667322 |
| | | | 195 | Nb$_2$O$_5$ | 180.729220 |
| | | | 196 | SiO$_2$ | 309.172085 |
| | | | 197 | Nb$_2$O$_5$ | 197.765045 |
| | | | 198 | SiO2 | 292.830833 |
| | | | 199 | Nb$_2$O$_5$ | 209.833715 |
| | | | 200 | SiO$_2$ | 340.313926 |
| | | | 201 | Nb$_2$O$_5$ | 249.167243 |
| | | | 202 | SiO$_2$ | 348.525419 |
| | | | 203 | Nb$_2$O$_5$ | 166.141222 |
| | | | 204 | SiO$_2$ | 308.318764 |
| | | | 205 | Nb$_2$O$_5$ | 186.006142 |
| | | | 206 | SiO$_2$ | 240.504569 |
| | | | 207 | Nb$_2$O$_5$ | 271.452540 |
| | | | 208 | SiO$_2$ | 432.259920 |
| | | | 209 | Nb$_2$O$_5$ | 154.228513 |
| | | | 210 | SiO$_2$ | 344.869009 |
| | | | 211 | Nb$_2$O$_5$ | 179.508473 |
| | | | 212 | SiO$_2$ | 410.522423 |
| | | | 213 | Nb$_2$O$_5$ | 214.030115 |
| | | | 214 | SiO$_2$ | 171.750331 |

Figure 13:
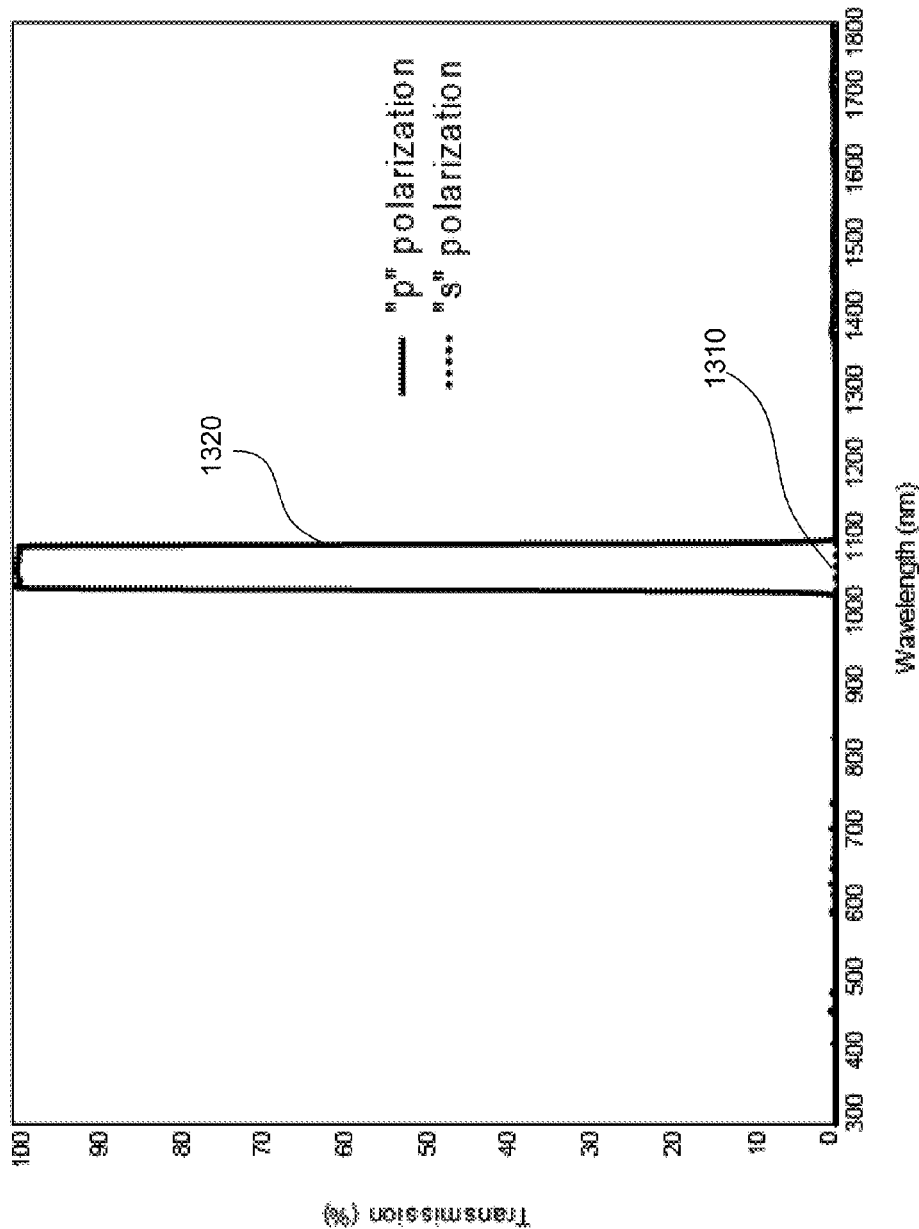
FIG. 13 depicts the calculated transmission percentage for both s-polarization and p-polarization of a 1064 nm Polarization Bandpass Filter consistent with an embodiment of the present disclosure and consistent with the structure identified in Table 3.
Figure 14:
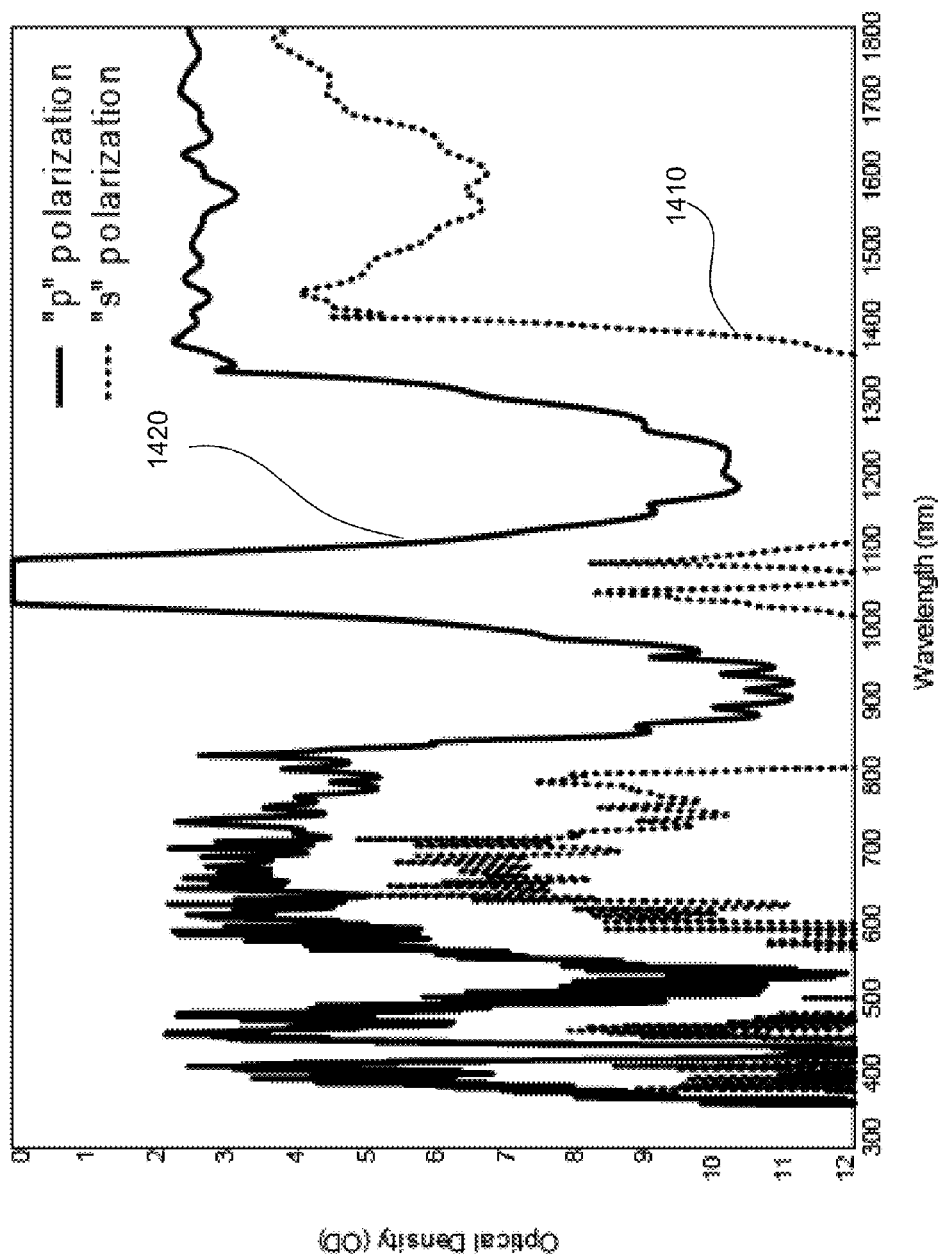
FIG. 14 depicts the calculated Optical Density (OD) for both s-polarization and p-polarization of a 1064 nm Polarization Bandpass Filter consistent with an embodiment of the present disclosure and consistent with the structure identified in Table 3.

FIGS. 13 and 14 depict the theoretical design spectra for p- and s-polarized light associated with the exemplary 1064 nm polarizing bandpass filter of Table 3. This exemplary filter may be used, for example, as a laser clean-up filter for a 1064 nm Nd:YAG, in which both polarization and spectral clean-up functions are performed. FIG. 13 depicts the calculated transmission percentage for s-polarization (dotted curve 1310) and p-polarization (curve 1320) and FIG. 14 depicts the calculated OD of the structure of Table 3 for s-polarization (dotted curve 1410) and p-polarization (curve 1420). The example illustrates the use of the extended blocking on the second side of the substrate to further expand the blocking range of the polarizing bandpass filter from UV up to 1800 nm, to cover the entire combined range of sensitivity of a typical Si photodiode and an InGaAs detector. The extended blocking also offers additional functionality by providing better than OD 6 blocking for both states of polarization over the second and the third harmonic wavelengths of 532 nm and 355 nm respectively. Furthermore, the coatings on opposite sides of the substrate are configured to exhibit almost the same coating stress in order to minimize substrate bending.

FIGS. 15 to 18 depict a comparison between the calculated characteristics depicted in FIGS. 11 and 12, and the measured characteristics of the embodiment described in Table 2 consistent with the disclosure and comprising a thin-film that was coated using an ion-assisted ion-beam sputtering deposition system. The thin-film coating method and equipment used to create the embodiment measured in FIGS. 15-18 is described in more detail in, for example, U.S. Pat. No. 7,068,430, herein incorporated by reference. The measurements on the resulting filter depicted in FIGS. 15-18 were obtained from a home-built spectrophotometer.

Figure 15:
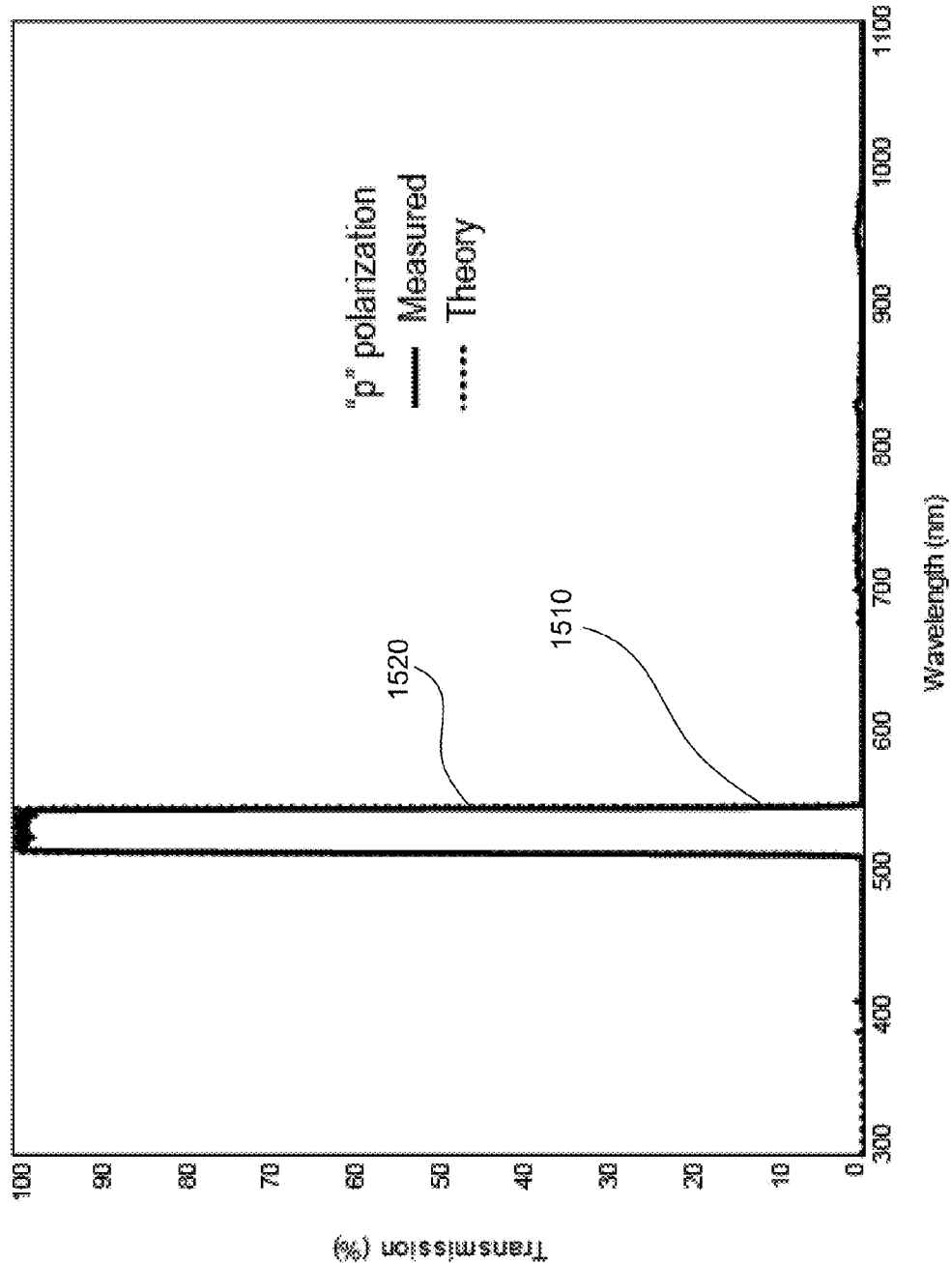
FIG. 15 depicts both the calculated and measured p-polarization transmission percentage of a 532 nm Polarization Bandpass Filter consistent with an embodiment of the present disclosure and consistent with the structure identified in Table 2.

FIG. 15 depicts both the calculated (dotted curve 1510) and measured (curve 1520) p-polarization transmission percentage of a 532 nm Polarization Bandpass Filter consistent with an embodiment of the present disclosure and consistent with the structure identified in Table 2. The extended blocking is apparent in this figure.

Figure 16:
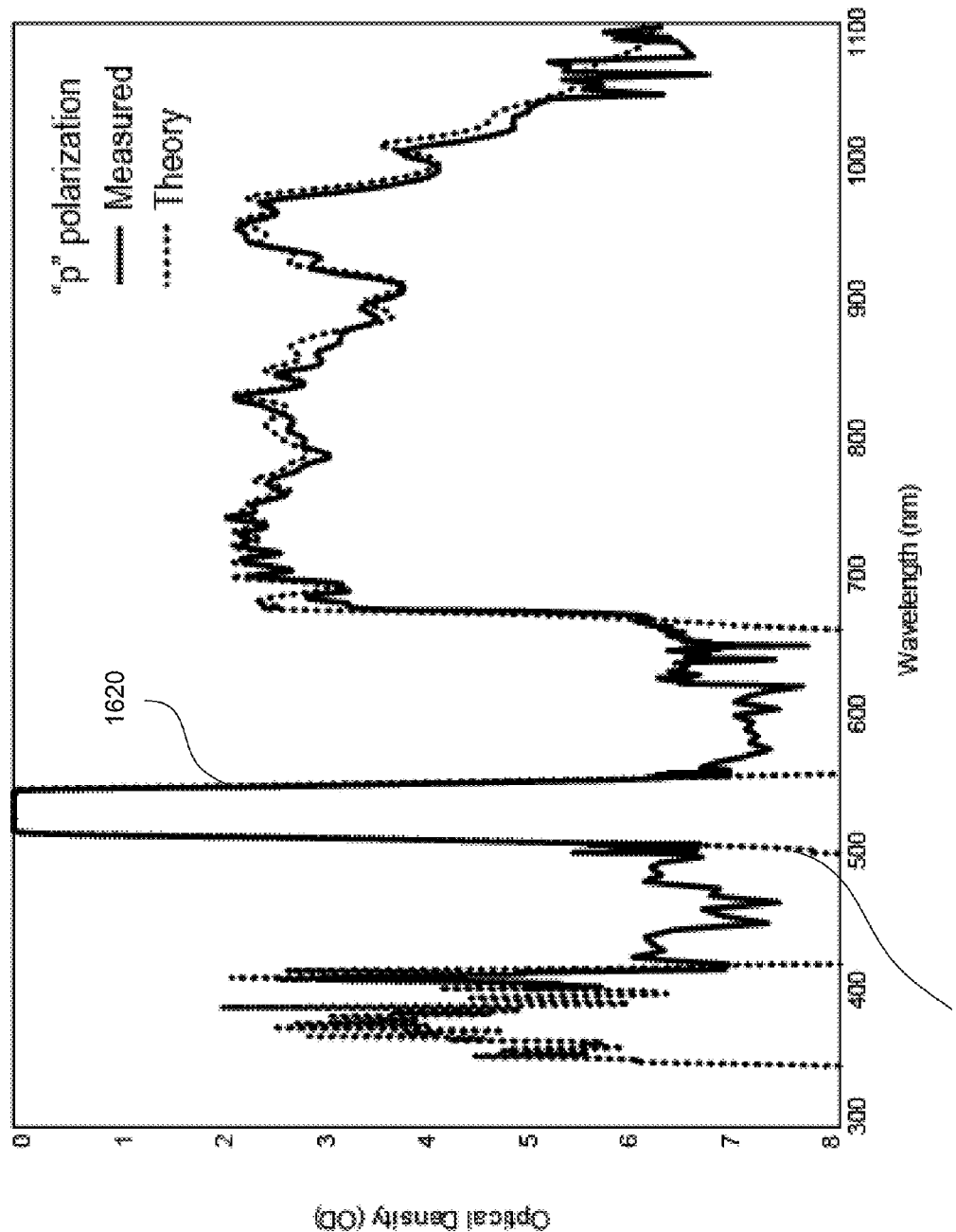
FIG. 16 depicts both the calculated and measured p-polarization Optical Density (OD) of a 532 nm Polarization Bandpass Filter consistent with an embodiment of the present disclosure and consistent with the structure identified in Table 2.

FIG. 16 depicts both the calculated (dotted curve 1610) and measured (curve 1620) p-polarization Optical Density (OD) of a 532 nm Polarization Bandpass Filter consistent with an embodiment of the present disclosure and consistent with the structure identified in Table 2. The measurement noise floor in FIG. 16 is different at different wavelengths. In general it is limited to about OD 4 (−40 dB), although it is lower at some wavelengths, particularly those further away from wavelengths of higher transmission (for either polarization).

Figure 17:
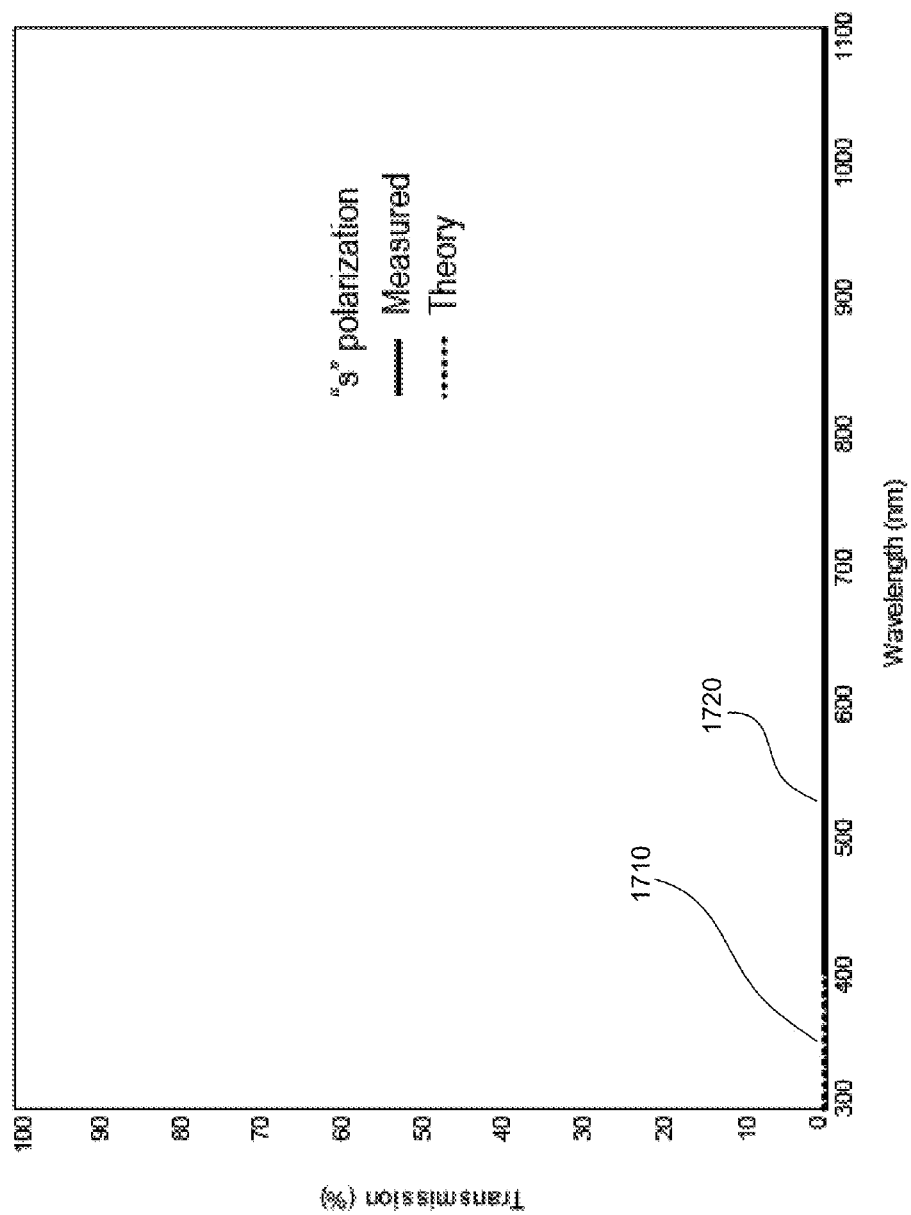
FIG. 17 depicts both the calculated and measured s-polarization transmission percentage of a 532 nm Polarization Bandpass Filter consistent with an embodiment of the present disclosure and consistent with the structure identified in Table 2.

FIG. 17 depicts both the calculated (dotted curve 1710) and measured (curve 1720) s-polarization transmission percentage of a 532 nm Polarization Bandpass Filter consistent with an embodiment of the present disclosure and consistent with the structure identified in Table 2. Note that the measured data and calculated data are both shown but are not distinguishable on this linear-scale plot.

Figure 18:
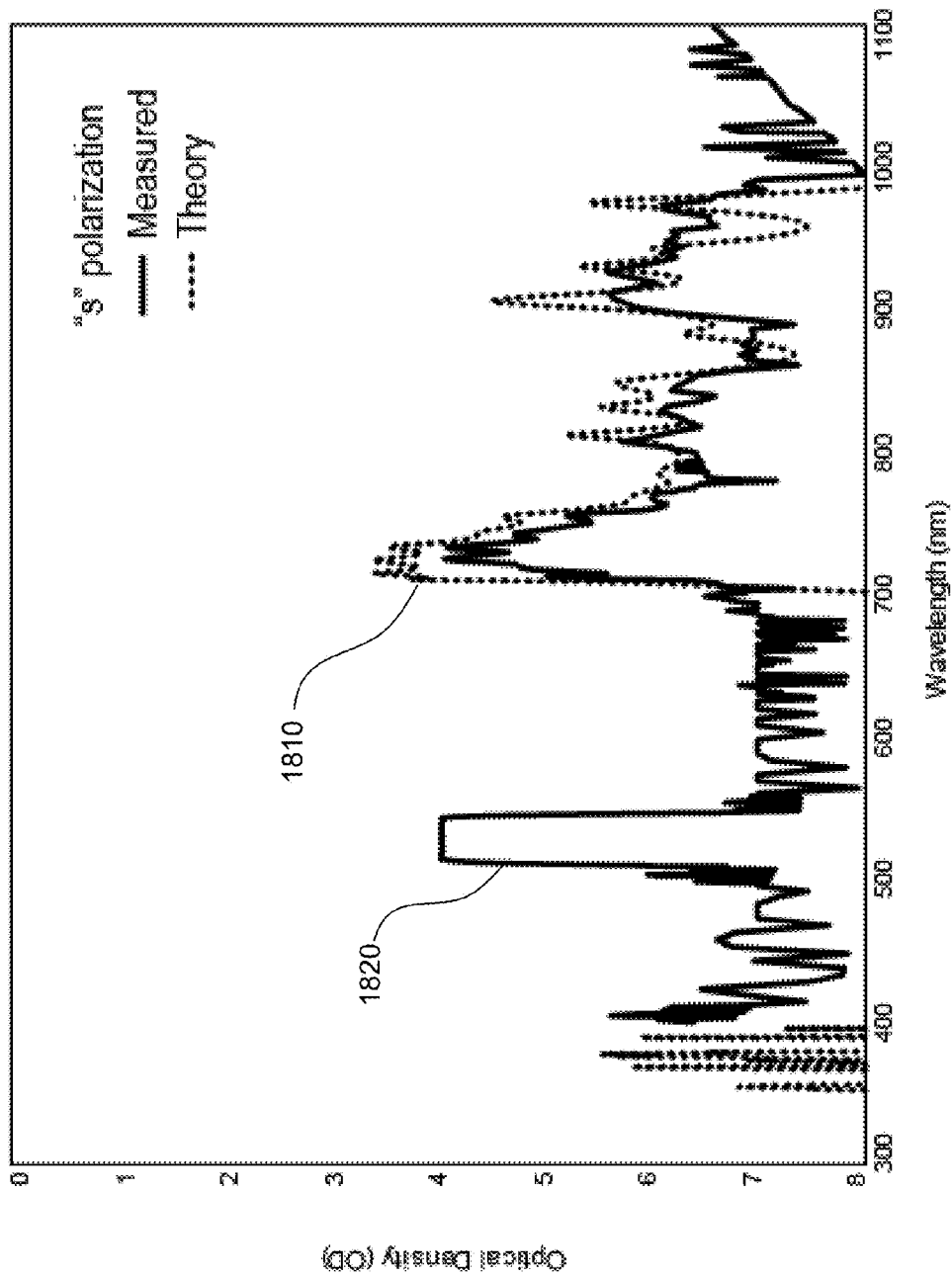
FIG. 18 depicts both the calculated and measured s-polarization Optical Density (OD) of a 532 nm Polarization Bandpass Filter consistent with an embodiment of the present disclosure and consistent with the structure identified in Table 2.
Figure 19:
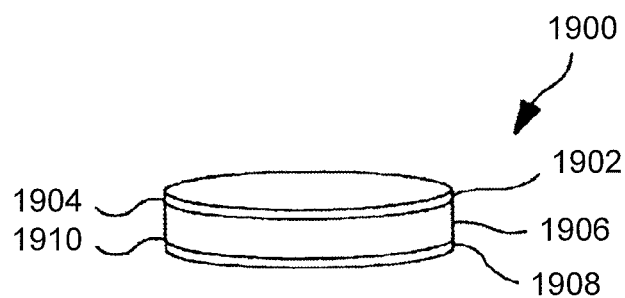
FIGS. 19 and 20 depict a conventional thin-film bandpass filter of the prior art.
Figure 20:
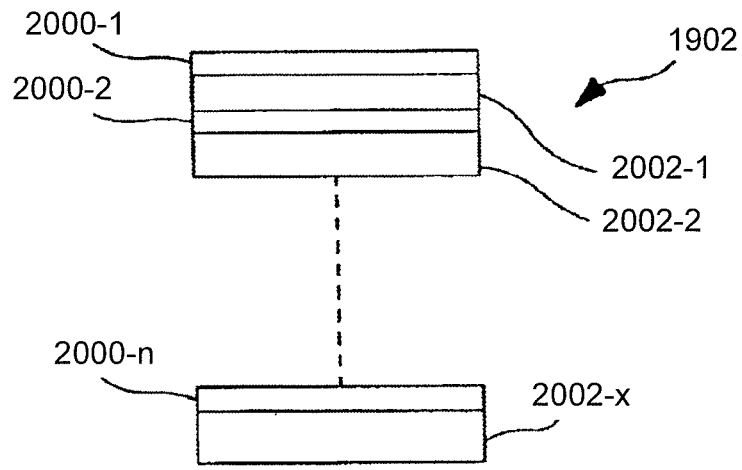
Figure 21:
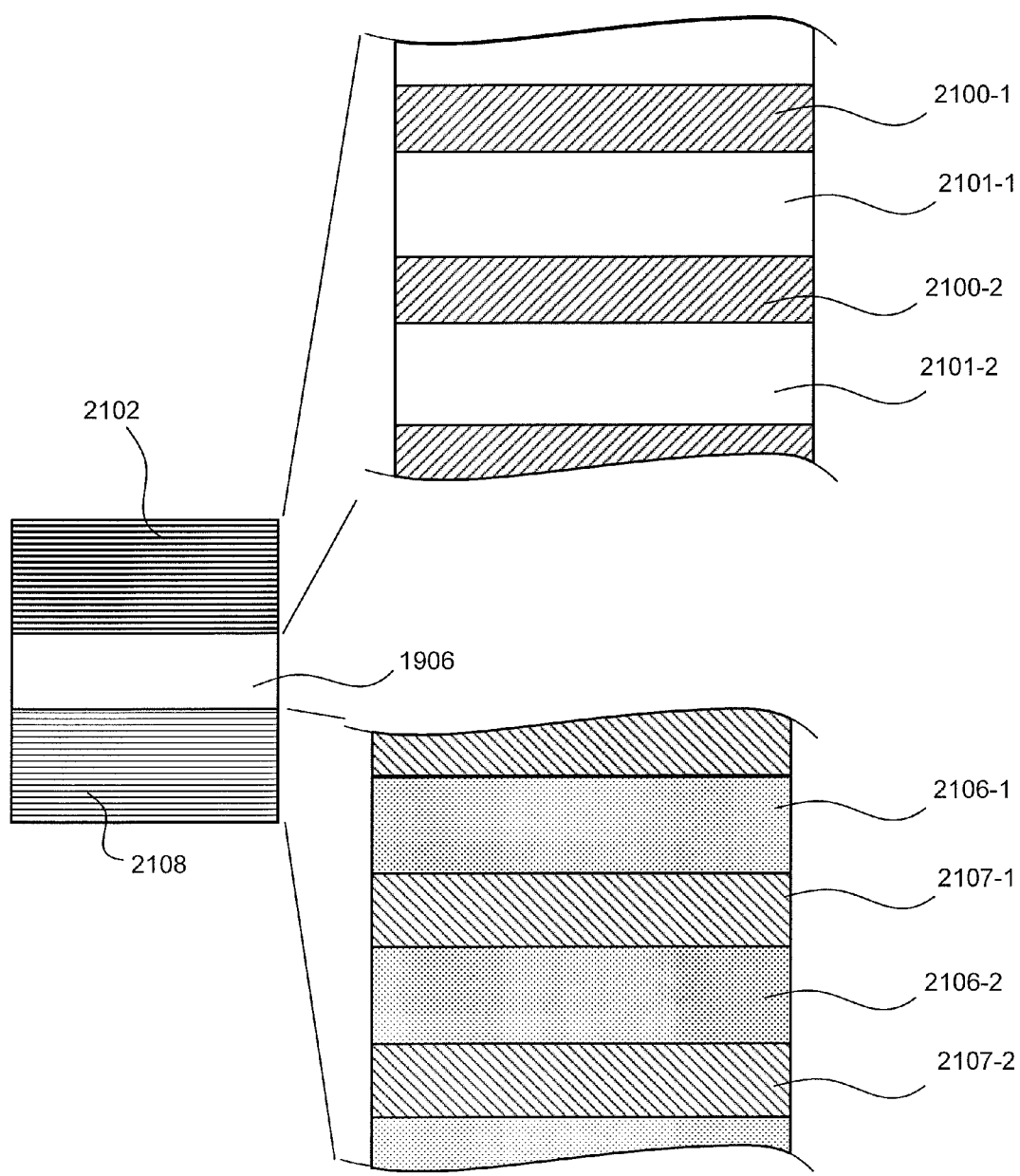
FIGS. 21-23 depict embodiments consistent with the current disclosure.
Figure 22:
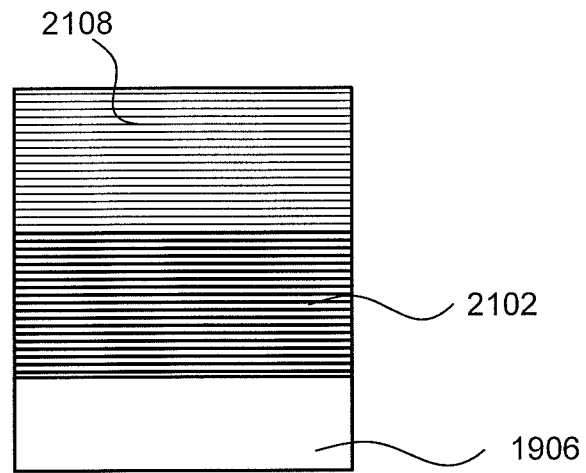
Figure 23:
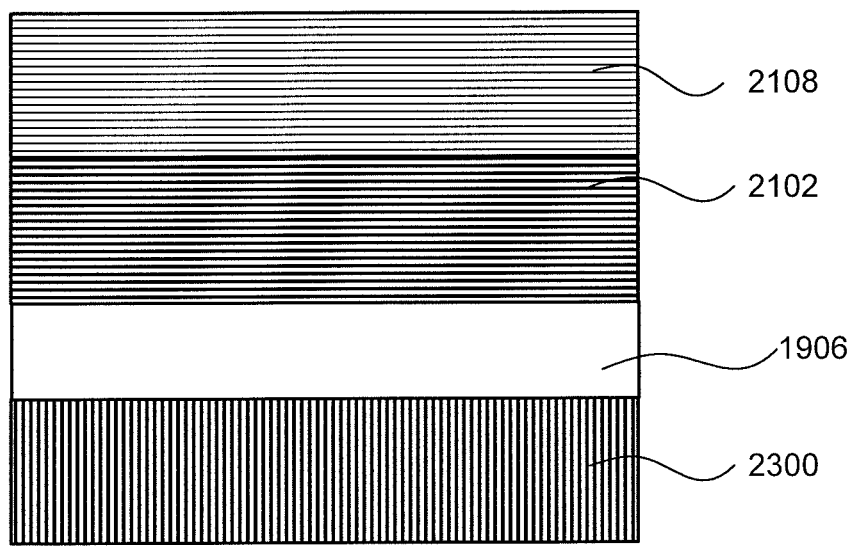

FIG. 18 depicts both the calculated (dotted curve 1810) and measured (curve 1820) s-polarization Optical Density (OD) of a 532 nm Polarization Bandpass Filter consistent with an embodiment of the present disclosure and consistent with the structure identified in Table 2. As with FIG. 16, the measurement noise floor in FIG. 18 is limited to about OD 4 (−40 dB), particularly within the filter passband region. Thus the apparent passband at approximately 532 nm with a peak value of approximately OD 4 is an artifact of the measurement system, and is not representative of the actual value of transmission of s-polarized light near these wavelengths.

In order to assess the laser damage threshold (LDT) of the filter produced and whose spectra are plotted in FIGS. 15-18, a filter was analyzed by a commercial test laboratory (Spica Technologies, Inc.). A pulsed 532 nm laser with 10 ns pulse widths and a 20 Hz repetition rate was used. The p-polarized laser beam was focused to a spot size ($1/e^2$) of 623 micrometers on the surface of the sample (the Polarizing Bandpass Filter coating side) at a 45 degree angle of incidence. 110 test sites were exposed on a single filter with 200 pulses per site. The testing concluded that the laser damage threshold was >1.75 $J/cm^2$; no damage was observed on 10 sites irradiated with this fluence, nor at any sites irradiated with fluence values below 1.75.

Materials and components consistent with the present disclosure, such as the exemplary PBF described above, offer solutions to all of the problems that have been identified. For example, they offer a contrast ratio equivalent to or higher than any other known available polarizer (>1,000,000:1). The acceptance angle range can be 10 degrees or more, and therefore is larger than that of comparative birefringence-based, high-contrast, high-LDT polarizers (Glan-Laser type). Additionally, light at angles of incidence outside of the acceptance angle range is extinguished for both polarizations, thus ensuring that no light of undesired polarization leaks through the polarizer, in contrast to birefringence-based polarizers which may allow unpolarized light to leak through at angles outside of the acceptance angle range. Furthermore, the clear aperture of a PBF consistent with the present disclosure can exceed 75 mm using existing manufacturing techniques, and in principle could be scaled even larger. Due to a simple, single-substrate configuration such as described above in the exemplary embodiment, the beam deviation of a PBF consistent with the present disclosure is limited by the quality of the underlying substrate, which can be readily held to tolerances below even a few arc seconds, compared to the few arc minute tolerances of many other polarizers. As discussed above, beam deviation due to bending of the substrate can be almost eliminated by implementing a balanced design strategy where the coating stresses on opposite sides of the substrate are configured to match to each other. Because of the flexibility of the AOI for a PBF consistent with the present disclosure, it can be chosen to be 45 degrees, thus enabling the orthogonal polarization of light to be deviated at a 90 degree angle, which enables convenient and compact optical system arrangement. The transmission characteristics of a PBF consistent with the present disclosure may be similar to that of other high-layer-count thin-film bandpass filters, which can approach 100%, for example, limited only by the quality of the anti-reflection (AR) coating performance. Similarly, the LDT of a PBF consistent with the present disclosure may be similar to that of other high-layer-count thin-film bandpass filters, which can be $kW/cm^2$ for cw laser light and >1 $J/cm^2$ for pulsed laser light. PBFs made from high-quality substrate glass with one or two hard, ion-beam-sputtered optical coatings can have excellent physical durability as well as optical quality, causing almost no distortion to a transmitted optical beam.

Further still, materials and components consistent with the present disclosure, offer the very unique spectral property in which it combines a polarizer and a bandpass filter together in one, single-substrate component. Linear polarization with a contrast ratio better than 1,000,000:1 is realized over a desired wavelength range, outside of which materials and components consistent with the present disclosure have deep attenuation better than OD 6 for both polarizations. Such a unique spectral property has a variety of applications. For example, materials and components consistent with the present disclosure can be placed at the output of a diode laser to clean up both background noise and at the same time works as a high-quality linear polarizer to improve polarization purity of output laser beam. In LIDAR and laser-based fluorescence microscope, polarization is also often utilized to provide further discrimination of background noise for enhancement of signal contrast. As pointed out above these applications and others can benefit from reduced optomechanical system complexity, higher overall transmission, decreased system weight, and, as a result, lower overall cost.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A bandpass filter and polarizer, comprising:
a first stack of layers, wherein the first stack of layers is configured to exhibit a first stop band for s-polarized radiation incident on the first stack of layers at an oblique angle between a first cut-on radiation wavelength and a first cut-off radiation wavelength, and wherein the first stack of layers is further configured to exhibit a second stop band for p-polarized radiation incident on the first stack of layers at said oblique angle between a second cut-on radiation wavelength and a second cut-off radiation wavelength; and
a second stack of layers, wherein the second stack of layers is configured to exhibit a third stop band for s-polarized radiation incident on the second stack of layers at said oblique angle between a third cut-on radiation wavelength and a third cut-off radiation wavelength, and wherein the second stack of layers is further configured to exhibit a fourth stop band for p-polarized radiation incident on the second stack of layers at said oblique angle between a fourth cut-on radiation wavelength and a fourth cut-off radiation wavelength;
wherein said second cut-on radiation wavelength is less than said first cut-on radiation wavelength;
wherein said third cut-off radiation wavelength is less than said fourth cut-off radiation wavelength;
wherein said first cut-on radiation wavelength is approximately equal to or larger than said third cut-off radiation wavelength; and
wherein said second cut-on radiation wavelength is less than said fourth cut-off radiation wavelength.

2. The bandpass filter and polarizer of claim 1, wherein:
said first stack of layers comprises alternating first and second layers, the first layers having a first refractive index and the second layers having a second refractive index.

3. The bandpass filter and polarizer of claim 2, wherein:
said second stack of layers comprises alternating third and fourth layers, the third layers having a third refractive index and the fourth layers having a fourth refractive index.

4. The bandpass filter and polarizer of claim 2, wherein: said first layer comprises $Nb_2O_5$.

5. The bandpass filter and polarizer of claim 2, wherein: said second layer comprises $SiO_2$.

6. An optical filter in accordance with claim 2, wherein:
said first layer includes at least one compound selected from: tantalum pentoxide ($Ta_2O_5$), hafnium oxide ($HfO_2$). and titanium dioxide ($TiO_2$).

7. The bandpass filter and polarizer of claim 1, further comprising:
a substrate.

8. The bandpass filter and polarizer of claim 7, wherein:
said substrate is between said first stack of layers and said second stack of layers.

9. The bandpass filter and polarizer of claim 7, wherein:
said first stack of layers and said second stack of layers are on the same side of said substrate.

10. The bandpass filter and polarizer of claim 9, further comprising:
an extended-blocking filter on the opposite side of said substrate from said first stack of layers and said second stack of layers.

11. The bandpass filter and polarizer of claim 10, wherein:
said extended blocking filter is configured to block a first range of radiation wavelengths that lie less than said second cut-off radiation wavelength, and configured to block a second range of radiation wavelengths that lie greater than said fourth cut-on radiation wavelength, and wherein said first range and said second range are substantially larger than said second stopband and said fourth stopband.

12. The bandpass filter and polarizer of claim 10, wherein:
said extended blocking filter is configured to exhibit a blocking of at least optical density (OD) 2 for all radiation wavelengths that lie between an ultraviolet wavelength and approximately 1100 nm.

13. The bandpass filter and polarizer of claim 10, wherein:
said extended blocking filter is configured to exhibit a blocking of at least optical density (OD) 2 for all radiation wavelengths that lie between an ultraviolet wavelength and approximately 1800 nm.

14. The bandpass filter and polarizer of claim 7, wherein:
said substrate comprises glass.

15. The bandpass filter and polarizer of claim 7, wherein:
a component comprising said first stack of layers, said second stack of layers, and said substrate exhibits an acceptance angle range with a magnitude of at least 10 degrees.

16. The bandpass filter and polarizer of claim 7, wherein:
a component comprising said first stack of layers, said second stack of layers, and said substrate exhibits a clear aperture of at least 25 mm.

17. The bandpass filter and polarizer of claim 7, wherein:
a component comprising said first stack of layers, said second stack of layers, and said substrate exhibits a clear aperture of at least 20 mm.

18. The bandpass filter and polarizer of claim 7, wherein:
a component comprising said first stack of layers, said second stack of layers, and said substrate exhibits a laser damage threshold (LDT) for cw laser radiation of at least 1 $kW/cm^2$.

19. The bandpass filter and polarizer of claim 7, wherein:
a component comprising said first stack of layers, said second stack of layers, and said substrate exhibits a laser damage threshold (LDT) for pulsed laser radiation of at least 1 $J/cm^2$.

20. The bandpass filter and polarizer of claim 7, wherein:
a component comprising said first stack of layers, said second stack of layers, and said substrate exhibits a contrast ratio of at least 1,000,000:1.

21. The bandpass filter and polarizer of claim 7, wherein:
a component comprising said first stack of layers, said second stack of layers, and said substrate exhibits a laser damage threshold (LDT) for cw laser radiation of at least 1 $kW/cm^2$.

22. The bandpass filter and polarizer of claim 7, wherein:
a component comprising said first stack of layers, said second stack of layers, and said substrate exhibits a laser damage threshold (LDT) for pulsed laser radiation of at least 1 $J/cm^2$.

23. The bandpass filter and polarizer of claim 1, wherein:
said oblique angle is approximately 45 degrees.

24. The bandpass filter and polarizer of claim 1, wherein:
at least one set of wavelengths approximately equal to a wavelength value lie between said second cut-on radiation wavelength and said fourth cut-off radiation wavelength; and
wherein said wavelength value is a value selected from: 325 nm, 375 nm, 405 nm, 440 nm, 488 nm, 515 nm, 532 nm, 543 nm, 561 nm, 568 nm, 591 nm, 633 nm, 647 nm, 670 nm, 780 nm, 808 nm, 830 nm, 980 nm, and 1064 nm.

25. The bandpass filter and polarizer of claim 1, wherein: said first stop band, said second stop band, said third stop band, and said fourth stop band exhibit an optical density (OD) of at least 5.

26. The bandpass filter and polarizer of claim 25, wherein: a component comprising said first stack of layers, said second stack of layers, and a substrate exhibits a transmission characteristic of at least 98%.

27. A method of making a bandpass filter and polarizer comprising:
providing a substrate;
depositing a plurality of first and second layers on said substrate to form a first stack of layers of alternating first and second layers, the first layers having a first refractive index and the second layers having a second refractive index;
depositing a plurality of third and fourth layers on said substrate to form a second stack of layers of alternating third and fourth layers, the third layers having a third refractive index and the fourth layers having a fourth refractive index;
configuring said first stack of layers such that said first stack of layers exhibits a first stop band for s-polarized radiation incident on the first stack of layers at an oblique angle between a first cut-on radiation wavelength and a first cut-off radiation wavelength, and further wherein the first stack of layers exhibits a second stop band for p-polarized radiation incident on the first stack of layers at said oblique angle between a second cut-on radiation wavelength and a second cut-off radiation wavelength;
configuring said second stack of layers such that said second stack of layers exhibits a third stop band for s-polarized radiation incident on the second stack of layers at said oblique angle between a third cut-on radiation wavelength and a third cut-off radiation wavelength, and further wherein the second stack of layers exhibits a fourth stop band for p-polarized radiation incident on the second stack of layers at said oblique angle between a fourth cut-on radiation wavelength and a fourth cut-off radiation wavelength; and
configuring said first stack of layers and said second stack of layers such that said second cut-on radiation wavelength is less than said first cut-on radiation wavelength, said third cut-off radiation wavelength is less than said fourth cut-off radiation wavelength, said first cut-on radiation wavelength is approximately equal to or larger than said third cut-off radiation wavelength, and said second cut-on radiation wavelength is less than said fourth cut-off radiation wavelength.

28. The method of making a bandpass filter and polarizer of claim 27, wherein:
said substrate is between said first stack of layers and said second stack of layers.

29. The method of making a bandpass filter and polarizer of claim 27, wherein:
said first stack of layers and said second stack of layers are on the same side of said substrate.

30. The method of making a bandpass filter and polarizer of claim 29, further comprising:
depositing an extended-blocking filter on the opposite side of said substrate from said first stack of layers and said second stack of layers.

31. The method of making a bandpass filter and polarizer of claim 30, wherein:
said extended blocking filter is configured to block a first range of radiation wavelengths that lie less than said second cut-off radiation wavelength, and configured to block a second range of radiation wavelengths that lie greater than said fourth cut-on radiation wavelength, and wherein said first range and said second range are substantially larger than said second stopband and said fourth stopband.

32. The method of making a bandpass filter and polarizer of claim 30, wherein:
said extended blocking filter is configured to exhibit a blocking of at least optical density (OD) 2 for all radiation wavelengths that lie between an ultraviolet wavelength and approximately 1100 nm.

33. The method of making a bandpass filter and polarizer of claim 30, wherein:
said extended blocking filter is configured to exhibit a blocking of at least optical density (OD) 2 for all radiation wavelengths that lie between an ultraviolet wavelength and approximately 1800 nm.

34. The method of making a bandpass filter and polarizer of claim 27, wherein:
said substrate comprises glass.

35. The method of making a bandpass filter and polarizer of claim 27, wherein:
said first layer comprises $Nb_2O_5$.

36. The method of making a bandpass filter and polarizer of claim 27, wherein:
said second layer comprises $SiO_2$.

37. The method of making a bandpass filter and polarizer of claim 27, wherein:
said first layer includes at least one compound selected from: tantalum pentoxide ($Ta_2O_5$), hafnium oxide ($HfO_2$), and titanium dioxide ($TiO_2$).

38. The method of making a bandpass filter and polarizer of claim 27, wherein:
said oblique angle is approximately 45 degrees.

39. The method of making a bandpass filter and polarizer of claim 27, wherein:
at least one set of wavelengths approximately equal to a wavelength value lie between said second cut-on radiation wavelength and said fourth cut-off radiation wavelength; and
wherein said wavelength value is a value selected from: 325 nm, 375 nm, 405 nm, 440 nm, 488 nm, 515 nm, 532 nm, 543 nm, 561 nm, 568 nm, 591 nm, 633 nm, 647 nm, 670 nm, 780 nm, 808 nm, 830 nm, 980 nm, and 1064 nm.

40. The method of making a bandpass filter and polarizer of claim 27, wherein:
said first stop band, said second stop band, said third stop band, and said fourth stop band are configured to exhibit an optical density (OD) of at least 5.

41. The method of making a bandpass filter and polarizer of claim 40, wherein:
said first stack of layers, said second stack of layers, and said substrate exhibits a transmission characteristic of at least 98%.

42. The method of making a bandpass filter and polarizer of claim 27, wherein:
said first stack of layers, said second stack of layers, and said substrate are configured as a component to exhibit an acceptance angle range with a magnitude of at least 10 degrees.

43. The method of making a bandpass filter and polarizer of claim 27, wherein:

said first stack of layers, said second stack of layers, and said substrate are configured as a component to exhibit a clear aperture of at least 75 mm.

44. The method of making a bandpass filter and polarizer of claim 27, wherein:

said first stack of layers, said second stack of layers, and said substrate are configured as a component to exhibit a clear aperture of at least 20 mm.

45. The method of making a bandpass filter and polarizer of claim 27, wherein:

said first stack of layers, said second stack of layers, and said substrate are configured as a component to exhibit a clear aperture of at least 25 mm.

46. The method of making a bandpass filter and polarizer of claim 27, wherein:

said first stack of layers, said second stack of layers, and said substrate are configured as a component to exhibit a contrast ratio of at least 1,000,000:1.

47. The method of making a bandpass filter and polarizer of claim 27, wherein:

said first stack of layers, said second stack of layers, and said substrate are configured as a component to exhibit a laser damage threshold (LDT) for cw laser radiation of at least 1 kW/cm$^2$.

48. The method of making a bandpass filter and polarizer of claim 27, wherein:

said first stack of layers, said second stack of layers, and said substrate are configured as a component to exhibit a laser damage threshold (LDT) for pulsed laser radiation of at least 1 J/cm$^2$.

\* \* \* \* \*